United States Patent
Umeda et al.

(10) Patent No.: US 7,265,929 B2
(45) Date of Patent: Sep. 4, 2007

(54) METHOD OF CONTROLLING AN ACTUATOR, AND DISK APPARATUS USING THE SAME METHOD

(75) Inventors: Makoto Umeda, Aichi (JP); Yoshihiro Ueno, Osaka (JP); Toshio Inaji, Osaka (JP); Hideki Kuwajima, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/451,803

(22) Filed: Jun. 13, 2006

(65) Prior Publication Data

US 2006/0279872 A1  Dec. 14, 2006

(30) Foreign Application Priority Data

Jun. 14, 2005  (JP) .............................. 2005-173367

(51) Int. Cl.
*G11B 21/02* (2006.01)
(52) U.S. Cl. ................................................ 360/75
(58) Field of Classification Search .................. 360/75, 360/77.02, 78.04, 78.06, 97.02, 256.4, 256.7
See application file for complete search history.

(56) References Cited

U.S. PATENT DOCUMENTS

| | | | | |
|---|---|---|---|---|
| 6,567,232 B1 * | 5/2003 | Klaassen | ...................... | 360/75 |
| 6,683,743 B2 * | 1/2004 | Gillis et al. | ..................... | 360/75 |
| 6,735,053 B2 * | 5/2004 | Miyamoto et al. | ....... | 360/256.4 |
| 6,946,854 B2 * | 9/2005 | Zayas et al. | ................. | 324/691 |
| 6,958,880 B2 * | 10/2005 | Lee et al. | ...................... | 360/75 |
| 6,977,794 B1 * | 12/2005 | Sun et al. | ................. | 360/78.06 |
| 7,095,201 B1 * | 8/2006 | Schreck et al. | ............. | 318/560 |
| 7,110,221 B2 * | 9/2006 | Kuwajima et al. | ....... | 360/254.7 |
| 7,119,992 B2 * | 10/2006 | Miyamoto et al. | ....... | 360/256.4 |
| 7,164,549 B2 * | 1/2007 | Flechsig et al. | ............... | 360/75 |
| 7,193,804 B1 * | 3/2007 | Kheymehdooz | ............. | 360/75 |
| 7,215,498 B2 * | 5/2007 | Calfee et al. | .................. | 360/75 |
| 2005/0041334 A1 * | 2/2005 | Kim et al. | ............... | 360/97.02 |

FOREIGN PATENT DOCUMENTS

| | | |
|---|---|---|
| JP | 8-221915 A | 8/1996 |
| JP | 2803693 B2 | 7/1998 |
| JP | 10-302418 A | 11/1998 |
| JP | 2002-260356 A | 9/2002 |
| JP | 2005-18965 A | 1/2005 |

* cited by examiner

*Primary Examiner*—Fred F. Tzeng
(74) *Attorney, Agent, or Firm*—RatnerPrestia

(57) ABSTRACT

A disk apparatus includes (a) an actuator having a head supporting arm with a tab formed on the arm and a voice coil fixed to the arm, which arm is rotatable on a horizontal rotary shaft as well as on a vertical rotary shaft, (b) a voice coil motor having an upper yoke with a magnet fixed to the upper yoke and a lower yoke sandwiching and confronting the voice coil, and (c) a ramp section guiding and holding the tab at a refuge place. When the actuator at the refuge place starts loading with a starter command, a pulsed driving current is applied to the voice coil temporarily for urging the tab against a tab-holding plane of the ramp section, thereby making use of repulsion force generated on the actuator, so that the tab can leave the refuge place efficiently for carrying out the loading operation.

19 Claims, 20 Drawing Sheets

METHOD OF CONTROLLING AN ACTUATOR, AND DISK APPARATUS USING THE SAME METHOD

FIELD OF THE INVENTION

The present invention relates to disk apparatuses having floating heads such as magnetic heads or optical heads, and more particularly it relates to a method of controlling an actuator, which swings a signal converting element (hereinafter referred to as a head), to move from a first position, i.e. having unloaded from a disk and resting at a refuge place, to a second position, i.e. starting loading toward the disk. The present invention also relates to disk apparatuses using the same control method.

BACKGROUND OF THE INVENTION

While a disc apparatus is at rest, an actuator including a head support arm having a head is held at a predetermined area (parking zone) over a recording medium, or the head is moved to a predetermined place near the periphery of the medium and held off the surface of the medium.

When the actuator receives an external shock during the rest of the disk apparatus at the predetermined place near the periphery of the disk, the actuator possibly moves from a refuge place to a data recording area on the medium, thereby damaging the surface of the data recording area due to a collision between the head and the surface of the medium. Here is another possibility of damaging the data recording area; when the apparatus starts working with the head held at the predetermined parking zone above the medium, sliding of the head on the surface of the medium sometimes damages the head and the surface of data area. On top of that, a collision between the actuator and other elements of the disk apparatus causes fatal damage to the other elements or the actuator. To avoid the foregoing damage, a conventional actuator has employed a latch device so that the actuator can be held at a given refuge place.

The conventional disk apparatus, of which actuator employs the latch device, is described hereinafter. The disk apparatus includes an actuator holding device. The actuator has a head at its first end, and a coil at its second end, which integrally forms a protrusion having an iron chip. This actuator is rotatably mounted on a rotary shaft. The coil and a permanent magnet rigidly mounted to a housing form a voice coil motor (VCM). The permanent magnet mounted to the housing confronts the iron chip of the actuator. The iron chip and the permanent magnet form the actuator holding device.

During the rest of the disk apparatus, the foregoing actuator holding device receives an electric current at the coil forming the VCM so that the actuator can move to a given refuge place. When the actuator approaches the refuge place, the iron chip is attracted by the permanent magnet, so that the actuator is fixed at the refuge place. This status protects the actuator against external force and prevents the actuator from moving because the actuator is fixed by magnetic attraction, so that data stored in a data recorded area of the recording medium and the head provided to the actuator are protected from careless movements of the actuator. This mechanism is disclosed in, e.g. Japanese Patent No. 2803693.

Another disk apparatus having an actuator holding device is also disclosed. This another one has a latch device formed of locking means and a solenoid coil, in addition to an actuator holding device similar to what is discussed above.

The latch device has resilience so that it can engage with the actuator in vertical direction. To be more specific, the latch device comprises the following elements:

a plunger made of iron and moved by supplying an electric current to the solenoid coil;

a leaf spring having vertical stress and being moved vertically in response to the movement of the iron plunger;

a magnet having first magnetic force and placed under the plunger as first magnetic field supplying means; and a VCM yoke having second magnetic force and placed above the plunger as second magnetic field supplying means. The solenoid coil generates magnetic force, which pushes up the plunger, when it receives a first electric current, so that the leaf spring moves upward. When a second electric current different from the first one is supplied, the solenoid coil generates magnetic force which push down the plunger, so that the leaf spring moves downward. On top of that, the first magnetic force of the magnet having downward magnetic force greater than upward stress of the leaf spring allows fixing the leaf spring at the lower position. In addition to the upward stress of the leaf spring, the second magnetic force of the VCM yoke allows attracting and fixing the leaf spring at the upper position.

When the disk apparatus having the foregoing structure is in operation, the plunger is attracted toward the magnet by the first magnetic force, and the leaf spring is urged downward by the plunger, so that the leaf spring is fixed at a height not prohibiting the actuator from moving. This is a lock-released status. On the other hand, when the disk apparatus is halted, the actuator is moved to a refuge place, i.e. a given locking place. Then the first electric current is supplied to the solenoid coil, which current is greater than the difference between the first magnetic force of the magnet and the stress of the leaf spring, and which current generates upward magnetic force. This first electric current moves the leaf spring upward and fixes it to the upper position. This is a locked status.

The current is supplied to the solenoid coil only when the status is changed from the lock released status to the locked status, and vice versa. However, when the leaf spring is fixed to the lower position or the upper position, namely, the actuator is in the lock released status or in the locked status, the current is not supplied to the solenoid coil. When the disk apparatus is halted, the leaf spring is fixed to the upper position by magnetic attraction from the iron chip and the permanent magnet. The actuator is thus locked at the refuge place. This is the locked status, which fixes the actuator riot only in horizontal direction but also in vertical direction, so that the actuator can be protected against external shocks and prevented from moving. Unexamined Japanese Patent Publication No. H08-221915 discloses one of the foregoing structures.

Another disk apparatus having an actuator holding device is described hereinafter. An actuator is rotatably provided on a swing shaft, and a head arm and a coil arm are placed confronting to each other with respect to the swing shaft in between. The disk apparatus structured above has the following features:

(1) The head arm comprises a carriage arm and a suspension arm which includes a tab having a protrusion for the head to take refuge in a ramp block, and a head slider having a magnetic head is mounted near to the tab.

(2) The coil arm having a voice coil mounted to its inner wall comprises an outer arm and an inner arm.

(3) The ramp block and an inertia latch device both provided to the refuge place of the actuator are housed in an enclosure.
(4) The ramp block fixed to the enclosure with screws has plural ramps protruded horizontally from a lateral face of ramp support, and the ramp has a complex plane including a first slope, a top plane, a second slope, a bottom plane and a third slope.
(5) The inertia latch device comprises the following elements:
an inertia lever swinging on the swing shaft;
a latch lever swinging on another swing shaft; and
a spring for holding the latch lever at an arm open position.

The inertia moment around the swing shaft of the inertia lever is set greater than that of the latch lever.

(6) The inertia lever includes a balance arm and an inertia arm that has a first engaging protrusion to be engaged with the latch lever at a first engaging section and a second engaging protrusion to be engaged with the latch lever at a second engaging section.
(7) The latch lever includes a latch arm having two protrusions to be engaged with an active end of the spring, a positioning protrusion, and a latch protrusion, and it also includes an auxiliary arm. The positioning protrusion determines an actuator open position and an actuator latching position of the latch lever. The latch protrusion engages with a tip of the inner arm of the actuator for latching the actuator when the latch lever moves to the actuator latching position.
(8) The ramp block and the inertia latch device form an actuator locking device.

The foregoing structure allows latching and locking the actuator at the refuge place, thereby preventing the head arm and the head slider from entering into a disk-mounted area. This structure is disclosed in, e.g. Unexamined Japanese Patent Publication No. H10-302418 and No. 2002-260356.

The foregoing disk apparatus including a conventional actuator holding device fixes the actuator at the refuge place by using attraction force of the iron chip provided to the actuator and the permanent magnet fixed to the housing. The actuator holding device structured above has thus comparatively strong resistance to a shock applied in the same direction as the swing direction of the actuator. However, it has comparatively weak resistance to a large shock or a shock having vertical components with respect to the swing direction. The holding device cannot function as a reliable holder when it receives a shock. Since the holding device needs the iron chip and the permanent magnet for holding the actuator at the refuge place, the number of elements forming the apparatus increases, which boosts the cost of the apparatus.

The disk apparatus having a conventional latch device of the actuator, which latch device is formed of locking means and a solenoid coil, includes an actuator holding device which comprises the following elements:
an iron chip provided to the actuator;
a permanent magnet provided to the housing;
a leaf spring for latching the actuator;
a magnet for fixing the leaf spring to the lower position;
a plunger for moving the leaf spring up and down; and
a solenoid coil for moving the plunger up and down.

When the disk apparatus is halted, this structure allows moving the actuator to the refuge place, and moving the leaf spring upward in response to the vertical movement of the plunger, so that the leaf spring is put into a locked status. As a result, the actuator is locked at the refuge place.

The structure discussed above is thus strongly resistant to a comparably great shock. However, if it receives an extraordinary great shock applied along the moving direction of the plunger, upward stress of the leaf spring and the second magnetic force of the VCM yoke should be set resistive enough to the shock. For this purpose, the plunger should be moved downward in order to resist to the large resultant force of the upward stress and the second magnetic force, thereby putting the leaf spring in a lock released status. To achieve this mechanism, it is needed to supply a large current to the solenoid coil for generating great magnetic force. As a result, a large size solenoid coil is required.

On top of that, a space is needed for placing respective elements forming the actuator latch device which locks the actuator at the refuge place, so that it becomes difficult to downsize the disk apparatus, or save an electric current, i.e. save power of the disk apparatus. The actuator latch device needs a large number of elements, which boosts the cost of the apparatus, and at the same time, causes to lower the reliability.

The actuator of the foregoing disk apparatus is placed rotatably around the swing shaft, and is formed of a head arm and a coil arm opposed to each other with respect to the swing shaft placed in between. This disk apparatus includes the inertia latch device formed of the inertial lever, latch lever and spring. While the disk apparatus is halted, this structure allows the inertia lever to rotate, thereby rotating the latch lever anti-clockwise if the apparatus receives a comparatively great shock. In this case, regardless of a direction of torque working on the latch lever, the latch lever rotates anti-clockwise. The latch protrusion of the latch arm engages with a tip of the inner arm of the coil arm provided to the actuator moving from the refuge place, so that the actuator is latched.

To achieve the foregoing mechanism, the inertia moment of the inertia lever is set greater than that of the latch lever. The actuator holding device having the inertia latch device discussed above can minimize a dead zone to the shock, so that the reliability of the holding device increases. However, the inertia latch device needs a large number of elements and also a space for accommodating those elements. Those factors increase the cost of the device and resist downsizing the device.

SUMMARY OF THE INVENTION

The disk apparatus of the present invention comprises the following elements:
(a) a head supporting arm having a tab at a tip of its first end, a head slider provided to the first end and having a signal converting element which records/reproduces a signal to/from a recording medium, and a voice coil provided to its second end;
(b) an actuator which supports the head supporting arm rotatably around a horizontal rotating shaft for rotating in parallel with a surface of the recording medium and around a vertical rotating shaft for rotating vertically with respect to the surface of the recording medium, and supported by a resilient member placed around the vertical shaft, which member energizes the actuator vertically toward the recording medium;
(c) a voice coil motor including;
(c-1) a pair of yokes placed vertically on both sides of the voice coil and confronting the voice coil placed in between;

(c-2) a magnet fixed to at least one of the yokes,
(d) a ramp block including;
  (d-1) a ramp section on which the tab of the head supporting arm touches and slides;
  (d-2) a refuge place; and
(e) an actuator control circuit which applies a driving current to the voice coil so that the tab is urged against a second plane of the refuge place in the ramp block where the tab is held, then applies another driving current to the voice coil so that the tab can leave the second plane, thereby moving the head slider from the ramp block toward the recording medium.

This structure allows issuing a starter command to the disk apparatus, whose actuator is in the refugee place, to start working, and when the actuator starts loading, the tab can jump from the second plane of the refuge place and to leave the ramp block with a rather small amount of current thanks to the availability of repulsive force of the actuator and repulsive driving force of the voice coil motor. The actuator kept at the refuge place can be thus released with a smaller amount of current applied to the voice coil for the release.

A method of controlling the actuator of the present invention controls the actuator of the foregoing disk apparatus at starting a load operation. The control method comprises the steps of
  (a) outputting a current command so that a driving current to be applied to the voice coil works such that the tab of the actuator is urged against the plane of the refuge place provided to the ramp block, then outputting a current command so that a driving current reversal to the foregoing urging driving current is applied;
  (b) detecting a back electromotive voltage generated by the voice coil, and outputting a back electromotive voltage signal;
  (c) finding a speed difference between a moving speed of the actuator and a given target speed, and calculating a current command in response to this speed difference, then outputting the current command; and
  (d) determining a position of the head slider with a reproduced signal supplied from the head whether the head slider is above a recording medium or on the ramp section of the ramp block.

The method discussed above allows the tab to jump from the plane of the refuge place for leaving the ramp block with only a small amount of current thanks to the availability of the repulsive force generated when the actuator moves towards the recording medium and the repulsive driving force of the voice coil motor. The amount of current to be applied to the voice coil for releasing the actuator from the refuge place can be thus reduced. As a result, power saving and downsizing of the apparatus can be achieved. The power supply can employ a lower voltage, and yet, higher reliability is achieved, so that an inexpensive actuator and a disk apparatus are obtainable.

DETAILED DESCRIPTION OF PREFERRED EMBODIMENT

A magnetic disk apparatus is taken as an example of a disk apparatus, and exemplary embodiments of the present invention are demonstrated hereinafter with reference to the accompanying drawings. Elements similar to those in the other embodiments have the same reference marks, and the descriptions thereof are sometimes omitted.

Embodiment 1

Figure 1:
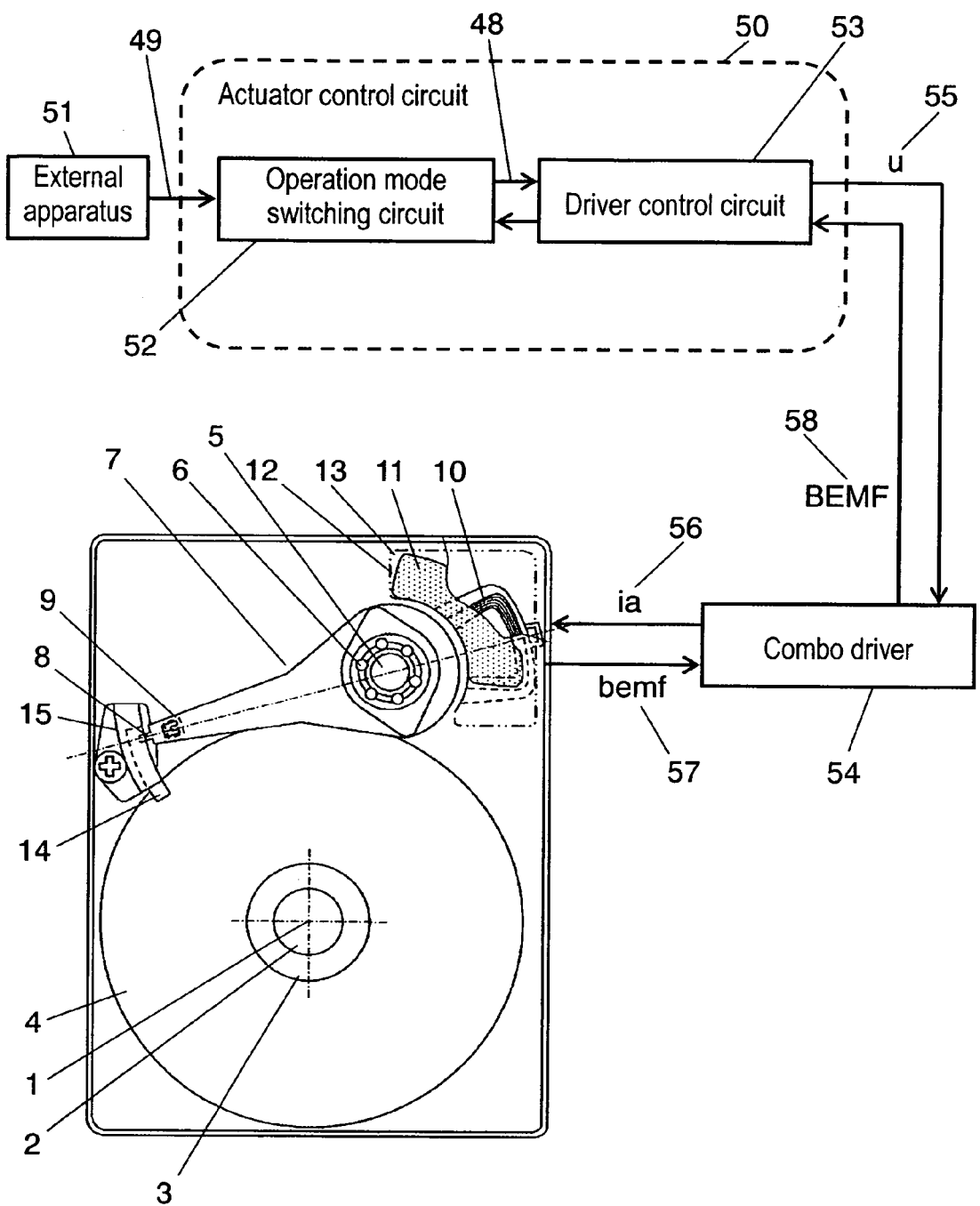
FIG. 1 shows a schematic diagram illustrating a main section of a magnetic disk apparatus in accordance with a first embodiment of the present invention.
Figure 2:
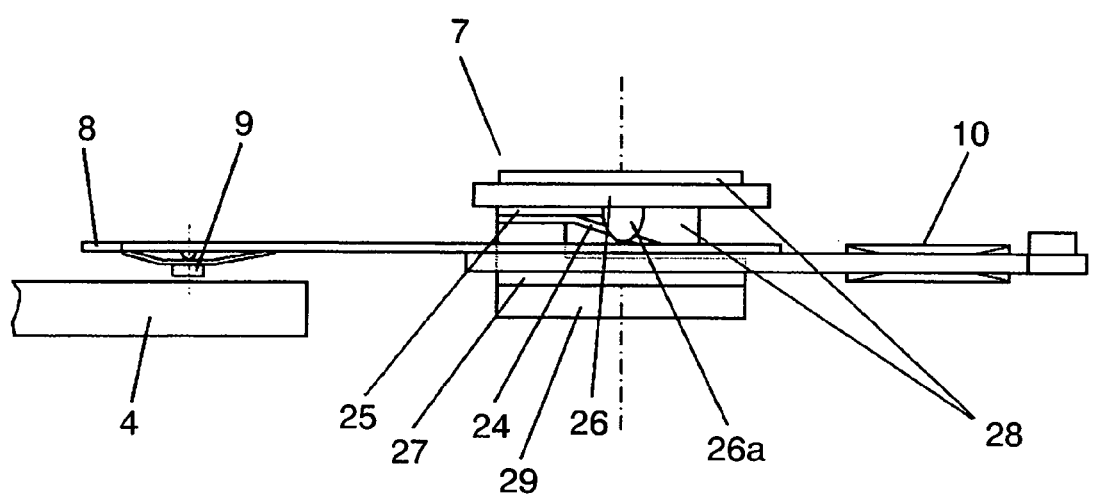
FIG. 2 shows a schematic lateral view illustrating a structure of an actuator in accordance with the first embodiment.
Figure 3:
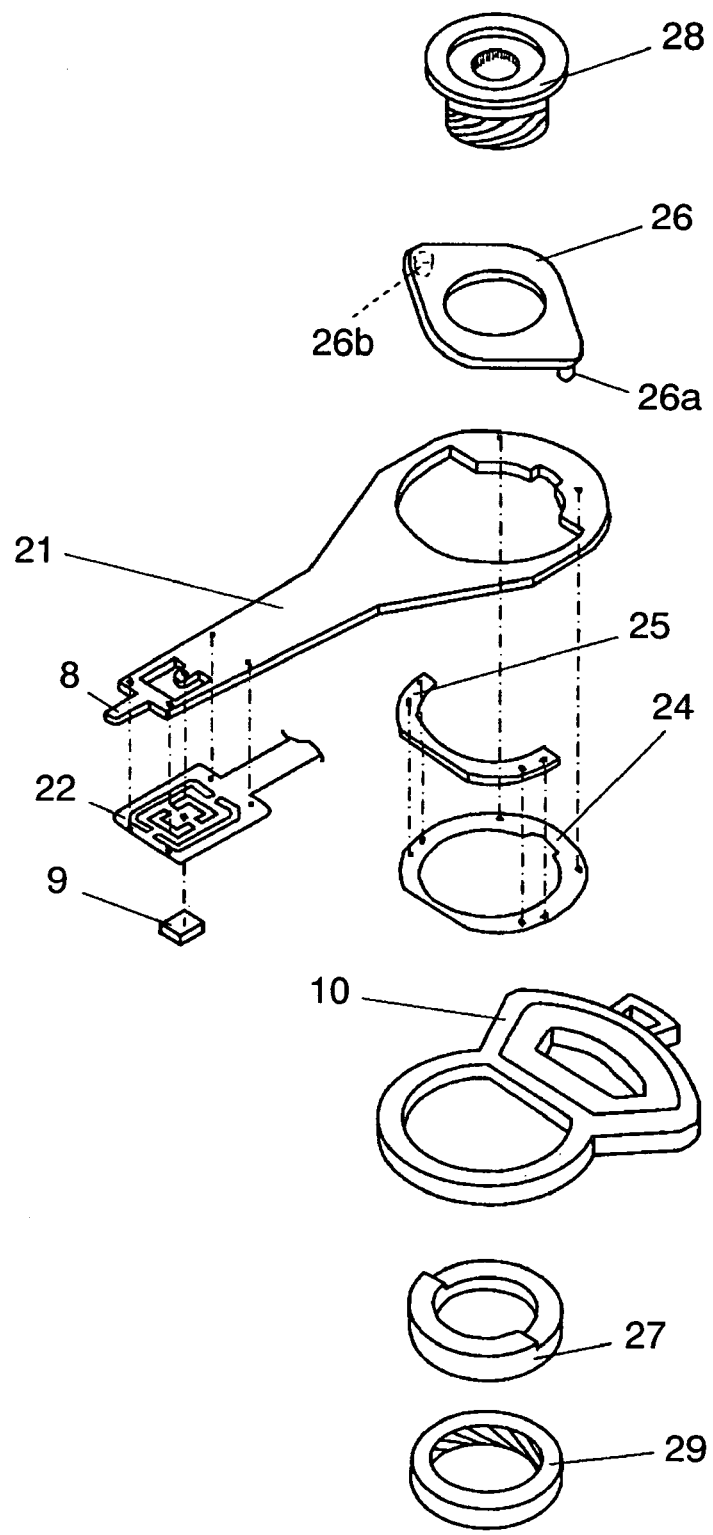
FIG. 3 shows a perspective exploded view illustrating the structure of the actuator in accordance with the first embodiment.
Figure 4:
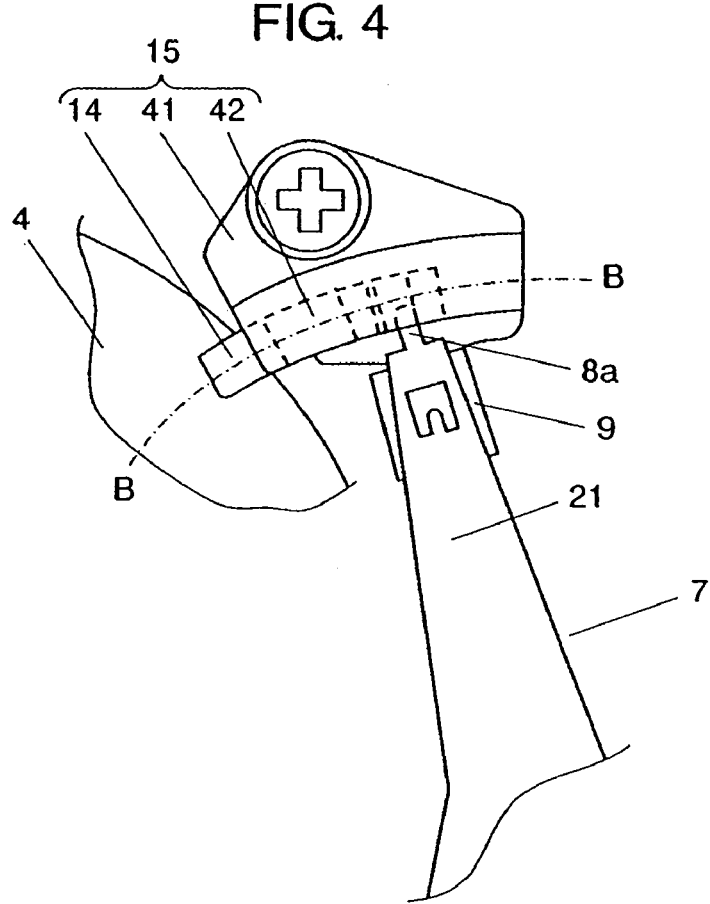
FIG. 4 shows a plan view illustrating a vicinity of a ramp block when the actuator is at a refuge place.
Figure 5:
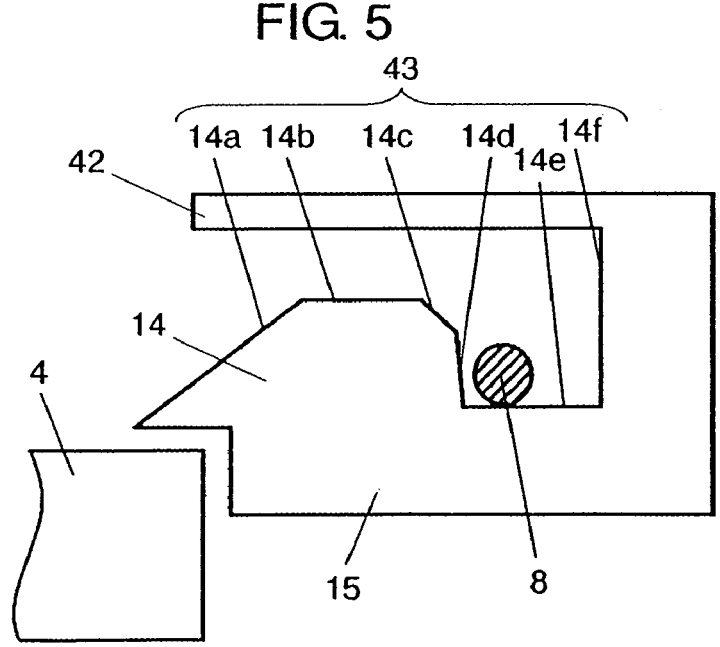
FIG. 5 shows a sectional development of the ramp section, a tab and a recording medium cut along line B-B in FIG. 4 and developed in accordance with the first embodiment.
Figure 6:
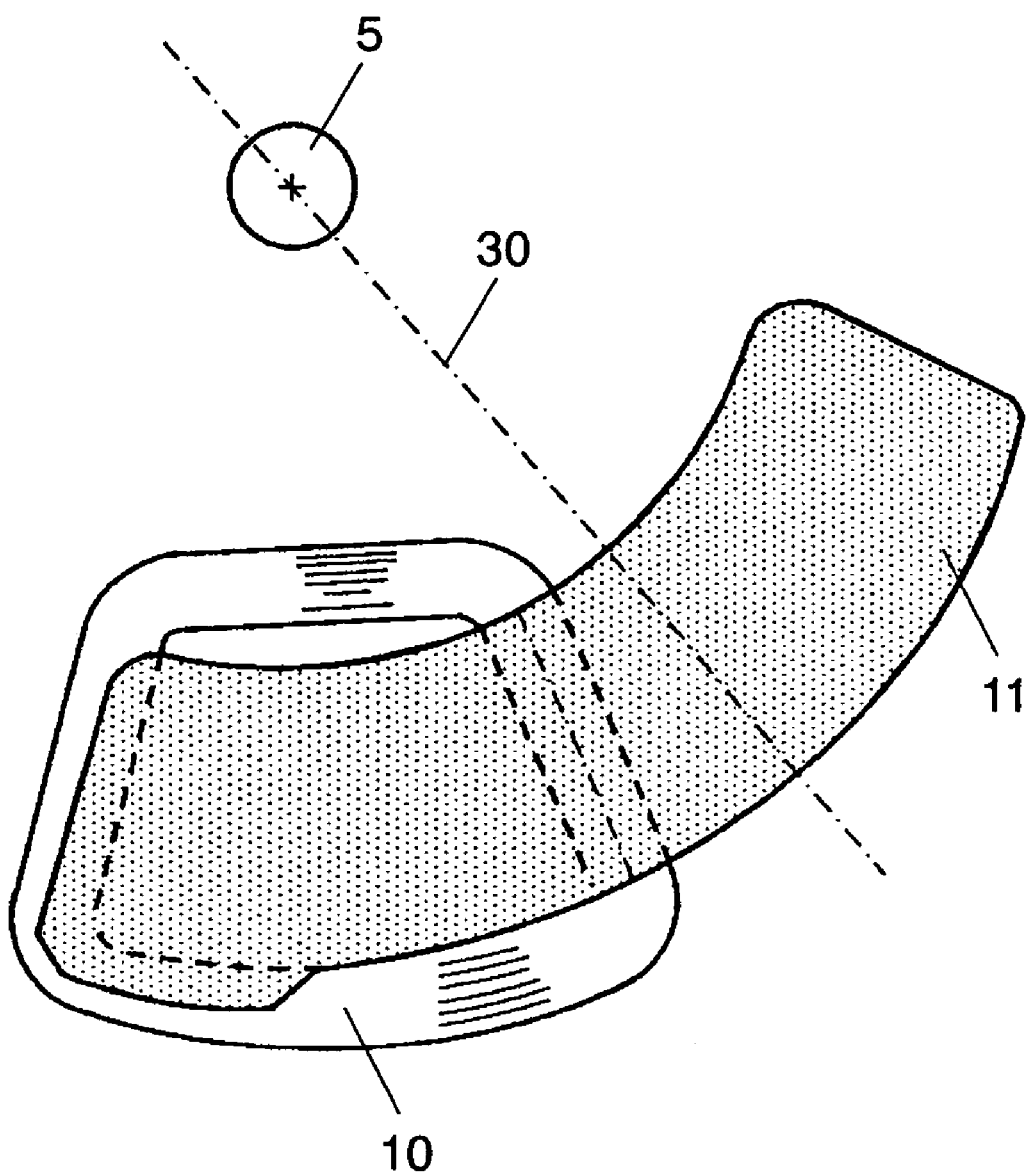
FIG. 6 shows an enlarged plan view illustrating a voice coil and a magnet viewed from the magnet side of a VCM in accordance with the first embodiment.
Figure 7A:
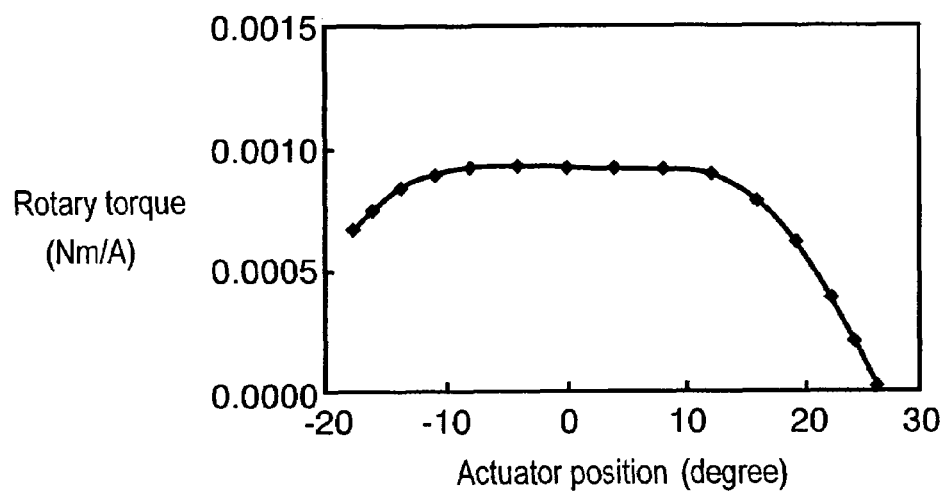
FIG. 7A shows a relation between a rotational position of the actuator and rotary torque of the VCM in accordance with the first embodiment.
Figure 7B:
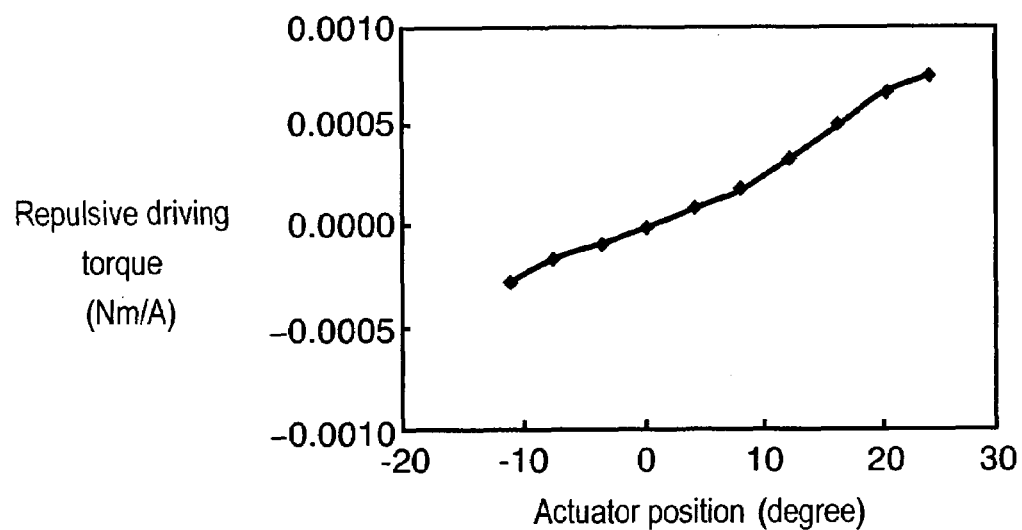
FIG. 7B shows a relation between a rotational position of the actuator and repulsive driving torque of the VCM in accordance with the first embodiment.
Figure 8:
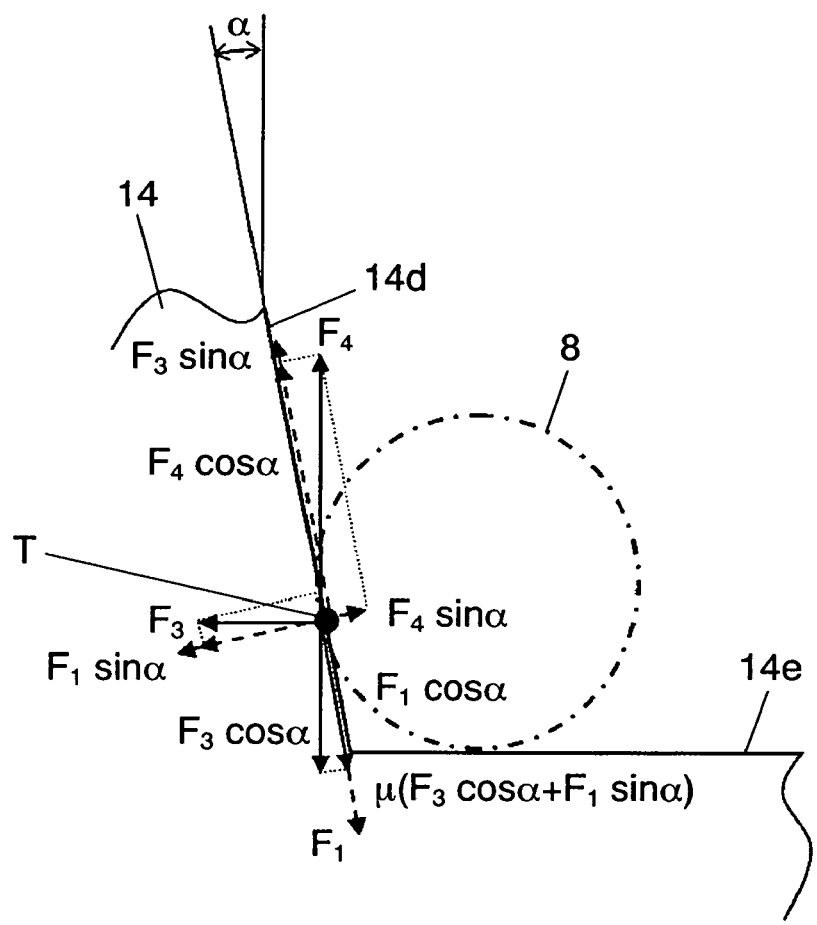
FIG. 8 illustrates how the tab works when the disk apparatus starts operating in accordance with the first embodiment.
Figure 9:
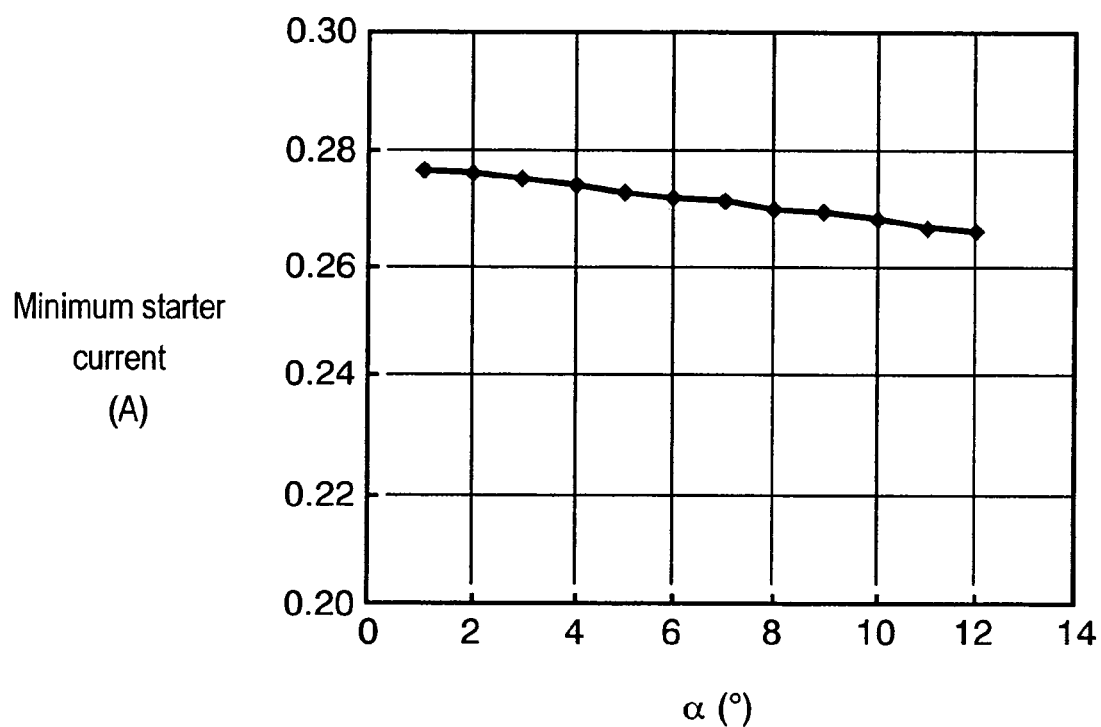
FIG. 9 shows a relation between an angle of a first step riser of the ramp block and a minimum current supplied to the voice coil when the disk apparatus starts operating.
Figure 10:
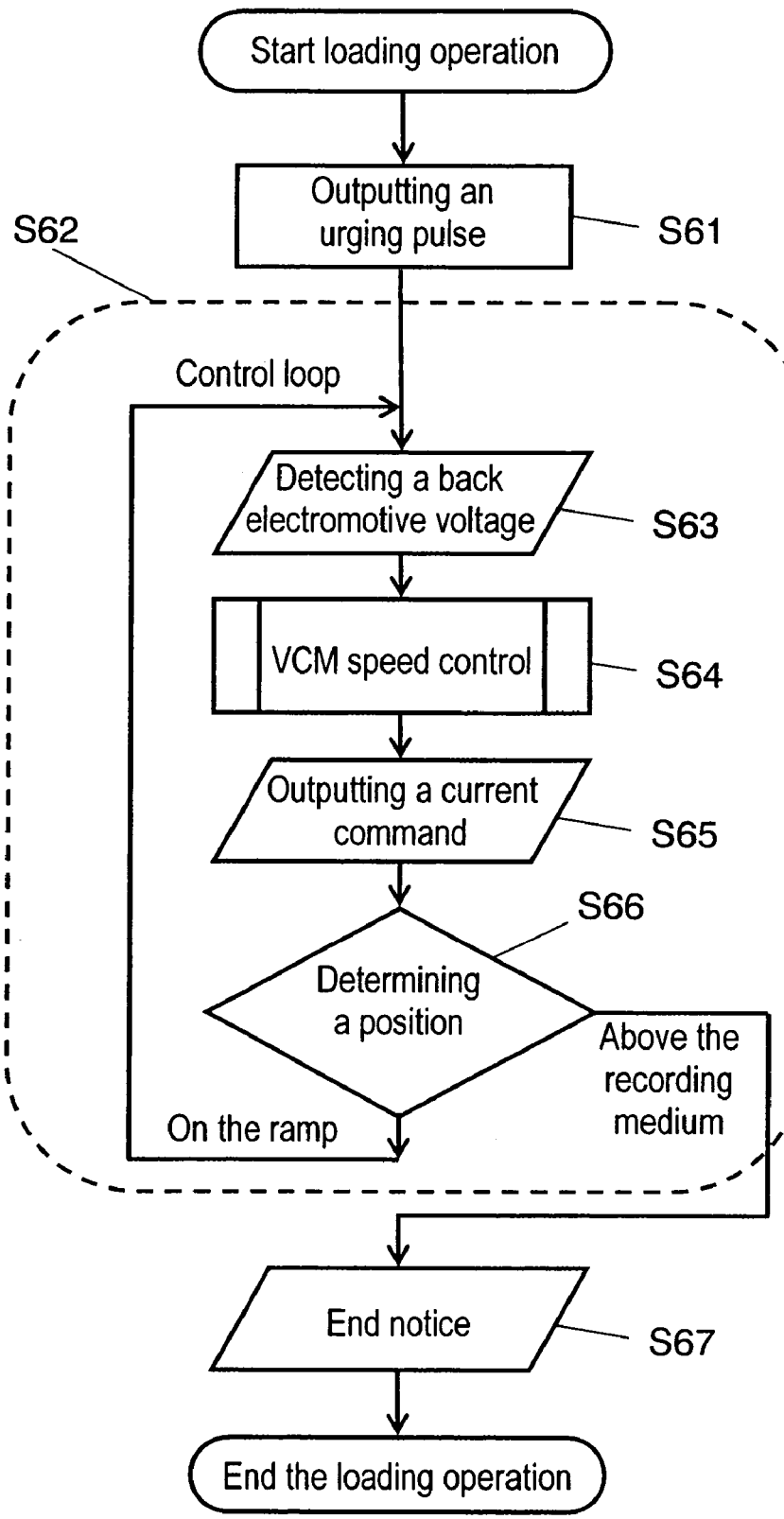
FIG. 10 shows a sequence flowchart of controlling the actuator at releasing a latch of the disk apparatus in accordance with the first embodiment.
Figure 11:
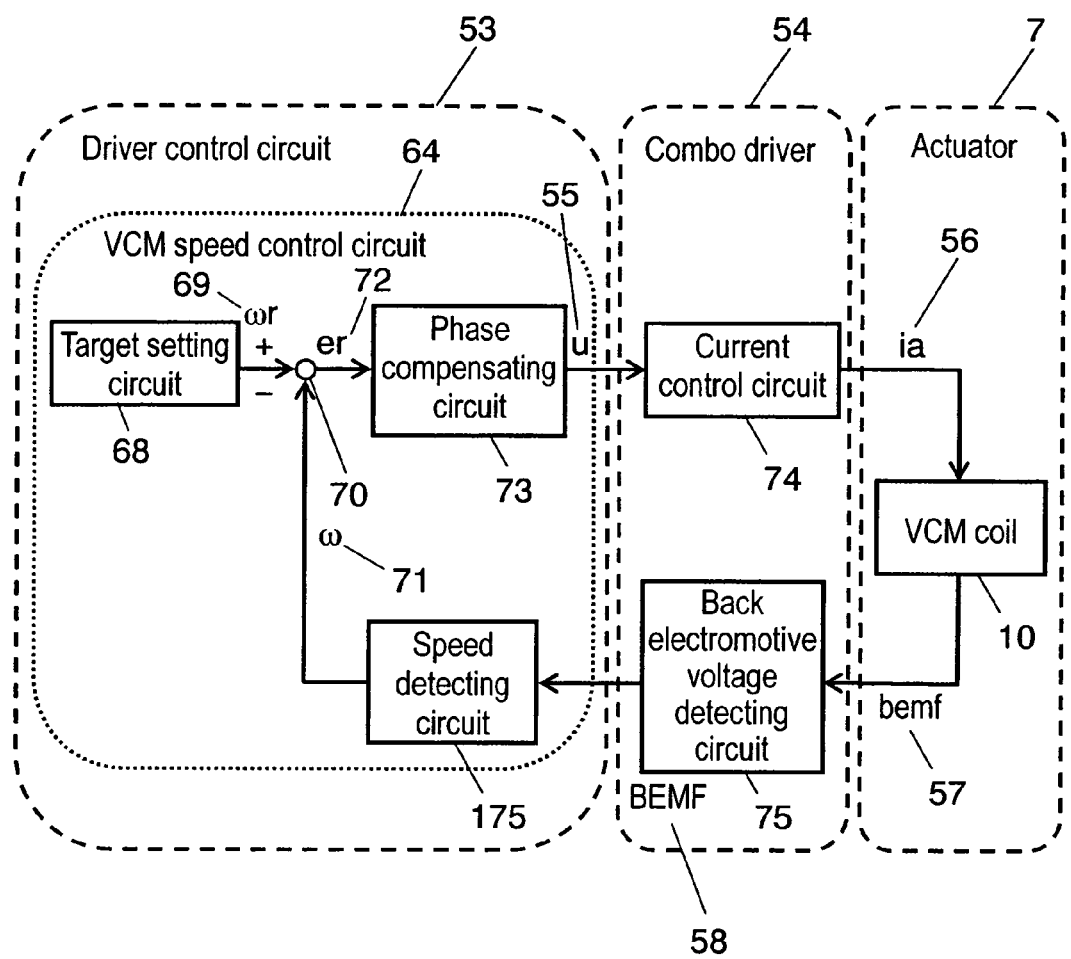
FIG. 11 shows a block diagram of an actuator control of the disk apparatus in accordance with the first embodiment.
Figure 12:
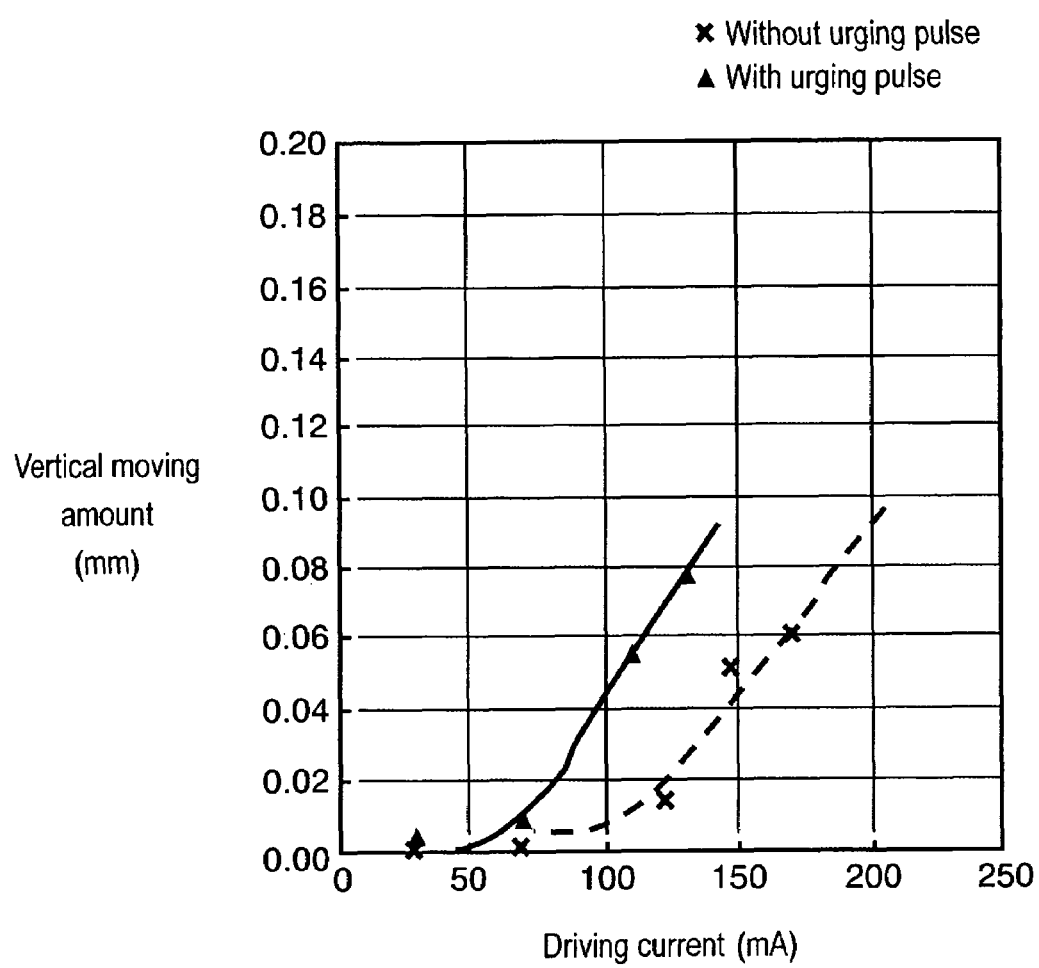
FIG. 12 shows a relation between a driving current applied to the voice coil and an amount of up-down movement of the actuator in accordance with the first embodiment.

FIG. 1-FIG. 12 illustrate how to control an actuator and also show the magnetic disk apparatus in accordance with the first embodiment of the present invention. FIG. 1 shows a schematic diagram illustrating a main section of a magnetic disk apparatus when the actuator is at a refuge place. FIG. 2 shows a schematic lateral view illustrating a structure of the actuator. FIG. 3 shows a perspective exploded view illustrating the structure of the actuator. FIG. 4 shows a plan view illustrating a vicinity of a ramp block when the actuator is at the refuge place. FIG. 5 shows a sectional development of the ramp section, a tab and a recording medium cut along line B-B in FIG. 4 and developed. FIG. 6 shows an enlarged plan view illustrating a voice coil and a magnet viewed from the magnet side of a VCM. FIG. 7A shows a relation between a rotational position of the actuator and rotary torque of the VCM. FIG. 7B shows a relation between a rotational position of the actuator and repulsive driving torque of the VCM. FIG. 8 illustrates how the tab works when the disk apparatus starts operating. FIG. 9 shows a relation between an angle of a riser of a first step of the ramp block and a minimum current supplied to the voice coil when the disk apparatus starts operating. FIG. 10 shows a sequence flowchart of controlling the actuator at releasing a latch of the disk apparatus. FIG. 11 shows a block diagram of an actuator control of the disk apparatus. FIG. 12 shows a relation between a driving current applied to the voice coil and an amount of up-down movement of the actuator.

In FIG. 1, a spindle motor (not shown) rotates on rotational center 1, and rotor hub 3 is rigidly mounted to rotary shaft 2 of the spindle motor. Recording medium 4 having a recording medium layer thereon is mounted on rotor hub 3. Horizontal rotary shaft 5 rotatably supports actuator 7 via bearing 6. Actuator 7 including a head supporting arm has tab 8 at its first end, where head slider 9 is provided at the inside of tab 8 on the arm. A magnetic head is mounted to head slider 9 via a gimbal device (not shown). Actuator 7 has voice coil 10 at its second end. Actuator 7 swings on rotary shaft 5 in parallel with the surface of recording medium 4.

Ramp block 15 is mounted to a chassis or other enclosure, and includes ramp section 14 having a guide that touches on tab 8 and regulates up-and-down movement of actuator 7.

Upper yoke 12 having magnet 11 fixed thereto is placed opposite to and above voice coil 10 and mounted to the chassis or another enclosure (not shown), namely, yoke 12 is on the other side of recording medium 4 with respect to actuator 7. Lower yoke 13 is mounted to the chassis or another enclosure such that upper and lower yokes 12 and 13 sandwich voice coil 10, and yoke 13 is on the recording medium side with respect to actuator 7. Voice coil 10, magnet 11 fixed to upper yoke 12, yokes 12 and 13 form a VCM (voice coil motor).

Supply of electric current to voice coil 10 confronting magnet 11 makes the VCM work and actuator 7 move along a radius direction of recording medium 4. When the disk apparatus is in operation, actuator 7 swings on rotary shaft 5 and moves over the data recording area of medium 4. While the disk apparatus is at rest, actuator 7 swings clockwise to a given place of ramp block 15, i.e. a refuge place.

The structure of actuator 7 is described hereinafter with reference to FIG. 1-FIG. 3. Head supporting arm 21 has tab 8 at a tip of its first end, and head slider 9 is disposed to arm 21 via gimbal device 22. Voice coil 10 is connected to arm 21 such that the VCM can swing arm 21 on shaft 5 and move arm 21 along the radius direction of medium 4. Annular leaf spring 24, i.e. resilient member, connected to semi-annular spring-fixing member 25 is coupled to arm 21.

Head supporting arm 21 including the forgoing members is held by pivot bearing 26 having a pair of pivots 26a and 26b (pivot 26b is not shown in FIG. 2) together with bearing 28 and nut 29 via collar 27, whereby actuator 7 is formed. A line running through respective contact points between the pair of pivots 26a, 26b and arm 21 is a phantom vertical rotary shaft, and arm 21 rotates on this vertical rotary shaft, which preferably runs through the shaft center of horizontal rotary shaft 5, and the center of gravity of the members on actuator 7 rotating on the vertical rotary shaft is preferably agrees with the shaft center of horizontal rotary shaft 5.

Head supporting arm 21 is resiliently coupled to pivot bearing 26 via the pair of pivots 26a, 26b and leaf spring 24. Leaf spring 24 urges downward the left side of arm 21 in FIG. 2 using the respective contact points between pivots 26a, 26b and arm 21 as the fulcrums. When the disk apparatus is in operation, the load to be applied to head slider 9 is generated by reaction force due to deformation of leaf spring 24 with respect to arm 21 at the contact points of pivots 26a, 26b, in other words, generated by compressing stress toward recording medium 4. Head slider 9 is mounted to arm 21 via gimbal device 22. Head slider 9 is thus floated by the difference between the load (generated by the compressing stress toward medium 4) applied to slider 9 and levitating force reversal to the load, so that a definite clearance is kept between the magnetic head and recording medium 4. Recording or reproducing operation of the disk apparatus is carried out in this status.

While the disk apparatus is at rest, actuator 7 swings on rotary shaft 5 and moves to the outside of medium 4. This is called a load and unload method well-known in the industry. At the unloading operation, ramp section 14 which guides actuator 7 to the refuge place is described hereinafter. A swing direction on shaft 5 is referred to as a load direction toward medium 4 and as an unload direction toward away from medium 4.

In FIGS. 4 and 5, ramp block 15 includes cover 42 and ramp section 14 partially protruding horizontally (in parallel with the surface of medium 4) from a lateral face of ramp mounting section 41. Ramp block 15 is mounted such that a part of ramp section 14 is overlaid above medium 4 vertically with a clearance in between toward the rotary center 1 of medium 4. Ramp section 14 includes top face 43 which is formed of first slope 14a, first plane 14b, second slope 14c, first step riser 14d, second plane 14e, and second step riser 14f. Tab 8 is urged against and slides on top face 43, thereby guiding actuator 7.

The space between the underside of cover 42 and first plane 14b of ramp section 14 is formed such that the space is greater than the thickness of tab 8, which thus can move through the space. Second slope 14c is not necessarily provided.

First and second planes 14b, 14e are formed in parallel with a plane perpendicular to rotary shaft 5. First step riser 14d forms the angle of (90+α)° with second plane 14e. The height of second plane 14e (height of rotary shaft 5 along the shaft center) is at least greater than the thickness of tab 8 (thickness of rotary shaft 5 along the shaft center). Second step riser 14f is substantially perpendicular to second plane 14e, and has a height at least exceeding first plane 14b.

While the disk apparatus is at rest, tab 8 is held at the refuge place, i.e. on second plane 14e.

If the disk apparatus receives a great external shock that tends to rotate actuator 7 toward medium 4, tab 8 should not move on first step riser 14d toward medium 4. For that purpose, assume that friction coefficient is $\mu \geq 0.2$ between first step riser 14d and tab 8, then the foregoing angle "α" is adjusted to be $\alpha \leq 11°$. Thus first step riser 14d is formed such that it forms an angle between 90 and 100 degrees with second plane 14e, then first step riser 14d can prevent tab 8 from moving toward medium 4.

If the disk apparatus receives a great external shock that tends to move actuator 7 toward the other side from (away from) medium 4, tab 8 hits against second step riser 14f so that actuator 7 can be prevented from moving. Tab 8 thus never comes off from second plane 14e, i.e. the refuge place.

Next, magnet 11 is described. Magnet 11 is fixed to upper yoke 12 opponent to voice coil 10, an element of the VCM, disposed to the second end of actuator 7. As shown in FIG. 6, magnet 11 is so magnetized as to situate the boundary between pole "N" and pole "S" on center line 30 (the alternate long and short dash line shown in FIG. 1) of rotary direction of actuator 7 along the circumference. To be more specific, center line 30 can be defined as the center line of rotary direction along circumference of voice coil 10 of actuator 7 when the magnetic head (not shown) is positioned at the center of the recording area.

The shape of magnet 11 is set as follows: a width of magnet 11 corresponding to the moving range of voice coil 10 while actuator 7 is in operation at a recording area of medium 4 (in other words, the width along longitudinal direction of actuator 7) is smaller than a width of magnet 11 corresponding to the area while actuator 7 is at the refuge place. Magnet 11 having the foregoing shape is fixed to upper yoke 12.

Supply of electric current to voice coil 10 prompts the VCM to rotate actuator 7, and at the same time, magnetic force according to Fleming's left-hand rule works between voice coil 10 and magnet 11. As a result, the rotating direction of actuator 7 and the repulsing/attracting direction to magnet 11 are determined by both of the current direction to voice coil 10 and the magnetic pole of magnet 11 confronting voice coil 10.

FIGS. 7A and 7B show rotary torque working on actuator 7 and repulsive driving torque working along a direction inverse to magnet 11. The rotary torque is generated by the VCM when a definite current is applied to voice coil 10. FIG. 7B shows the repulsive driving torque generated when the VCM receives a command of loading.

In FIGS. 7A and 7B, the position of actuator 7 is situated at the origin of the lateral axis with respect to the VCM when the magnetic head (not shown) is positioned at the center of a recording area of medium 4. The lateral axis indicates the direction to the refuge place as a positive direction (+) from the origin and a rotating angle (degree) as a position of actuator 7. The vertical axis indicates torque/unit current; the current is supplied to voice coil 10.

In this embodiment, a current is supplied to voice coil 10 so that actuator 7 rotates along the loading direction, then the rotary torque generated by the VCM as shown in FIG. 7A rotates actuator 7 toward medium 4. At the same time, as shown in FIG. 7B, the repulsive driving torque generated by the VCM works on actuator 7, thereby tending to move tab 8 upward from second plane 14e. At this time, the rotary torque generates the force to move actuator 7 toward medium 4, and as shown in FIG. 8, horizontal driving force $F_3$ urges tab 8 against first step riser 14d. The repulsive driving torque tends to rotate actuator 7 vertically to the surface of medium 4, and vertical driving force $F_4$ works for uplifting tab 8.

FIG. 8 shows how tab 8 works on first step riser 14d at tangent point T between tab 8 and riser 14d. Resilient force of leaf spring 24 applies energizing force $F_1$ to tab 8, and horizontal driving force $F_3$ generated by the VCM works on tab 8. Both of $F_1$ and $F_3$ urge tab 8 against riser 14d. Vertical driving force $F_4$ generated by the VCM tends to make tab 8 leave riser 14d.

Vertical driving force $F_4$, which makes tab 8 override first step riser 14d and move from the refuge place to medium 4, can be determined depending on the relation between urging component force $f_1$ vertical to riser 14d of the urging force against riser 14d and away component force $f_2$ vertical to riser 14d of the keep-away force working on tab 8.

Urging component force $f_1$ and keep-away component force $f_2$ both vertical to first step riser 14d can be found from equation (1) and (2):

$$f_1 = F_1 \times \sin\alpha + F_3 \times \cos\alpha \tag{1}$$

$$f_2 = F_4 \times \sin\alpha \tag{2}$$

When the relation of $f_1 > f_2$ is satisfied, tab 8 does not receive the urging force against riser 14d, so that vertical driving force $F_4$, which makes tab 8 override riser 14d and move actuator 7 from the refuge place to medium 4, can be determined to satisfy the following equation (3).

$$F_4 \geq F_1 + F_3 \times \cot\alpha \tag{3}$$

When the relation between $f_1$ and $f_2$ is "$f_1 > f_2$", satisfaction of the following equations makes tab 8 override riser 14d and move actuator 7 to medium 4: resisting resultant force f5 of frictional force f3+component force f4 should be smaller than component force f4 oriented along riser 14d of vertical driving force $F_4$. Frictional force f3 and component force f4 can be expressed in equations (4) and (5).

$$f_3 = \mu \cdot (f_1 - f_2) \tag{4}$$
$$= \mu \cdot (F_1 \cdot \sin\alpha + F_3 \cdot \cos\alpha - F_4 \cdot \sin\alpha)$$

$$f4 = F_1 \cdot \cos\alpha \tag{5}$$

Resisting resultant force $f_5$ can be found from equation (6).

$$f_5 = f_3 + f_4 = F_1 \cdot \cos\alpha + \mu \cdot (F_1 \cdot \sin\alpha + F_3 \cdot \cos\alpha - F_4 \cdot \sin\alpha) \tag{6}$$

Component force $f_6$ oriented along riser 14d of vertical driving force $F_4$ is expressed in equation (7).

$$f_6 = F_4 \cdot \cos\alpha \tag{7}$$

Thus component force f6 and resisting resultant force $f_5$ satisfy equation (8) so that actuator 7 can override riser 14d and move from the refuge place to medium 4.

$$F_4 \cdot \cos\alpha > F_1 \cdot \cos\alpha + \mu \cdot (F_1 \cdot \sin\alpha + F_3 \cdot \cos\alpha - F_4 \cdot \sin\alpha) \quad (8)$$

Then equation (9) is obtained.

$$F_4 > F_1 + \mu \cdot (F_1 \cdot \tan\alpha + F_3 \cdot \cos\alpha + F_4 \cdot \sin\alpha) \quad (9)$$

Since $F_4 > 0$, $\tan\alpha \geq 0$, equation (10) is obtainable.

$$F_1 + \mu \cdot (F_1 \cdot \tan\alpha + F_3) > F_1 + \mu \cdot (F_1 \cdot \tan\alpha + F_3 - F_4 \cdot \tan\alpha) \quad (10)$$

It can be thus concluded that when vertical driving force $F_4$ generated by the VCM is set to satisfy equation (11), actuator 7 can override first-step riser 14d and move from the refuge place to recording medium 4.

$$F_4 > F_1 + \mu \cdot (F_1 \cdot \tan\alpha + F_3) \quad (11)$$

At the refuge status, if a rotating shock gives actuator 7 rotating force, considering the force uplifting tab 8, i.e. the foregoing vertical driving force $F_4 = 0$, it is self-explanatory that actuator 7 cannot override substantially vertical plane 14e only with the horizontal rotating force.

FIG. 9 shows a current necessary for actuator 7 to override first step riser 14d in response to a change of angle $\alpha$ of $(90+\alpha)°$, i.e. angle of riser 14d with respect to second plane 14e. The VCM generates the rotary torque and the repulsive driving force shown in FIG. 7. According to this first embodiment, the easiest condition for actuator 7 to override riser 14d includes $(90+\alpha)° = 101°$ and the minimum frictional coefficient $\mu = 0.2$, and in this condition, application of a driving current greater than approx. 270 mA allows actuator 7 to override riser 14d.

Recently a magnetic disk apparatus has been downsized and widely used in portable apparatuses or mobile apparatuses, which need the features of power saving and a lower driving voltage such as 3.3V or 3V. Embodiment of these features in the magnetic disk apparatus will limit the current to be applied to the VCM of actuator 7. In the case of actuator 7 in accordance with this first exemplary embodiment, voice coil 10, an element of the VCM, can receive the maximum current of approx. 220 mA at 3.3V power voltage, and approx. 180 mA at 2.7V power voltage without using an additional circuit such as a booster.

When a loading command prompts a magnetic disk apparatus mounted in a portable apparatus or a mobile apparatus to start loading, an electric current to be applied to the VCM of actuator 7 is unrealistic if it is greater than 270 mA. A method of controlling the actuator and an operation sequence for improving the driving current in this case are demonstrated hereinafter.

A feature of this first embodiment is to positively use vertical resiliency of leaf spring 24 in the operation sequence for controlling the actuator 7. FIG. 1, and FIG. 10-FIG. 16 illustrate the actuator controlling method at loading and unloading.

FIG. 1 shows a block diagram of a driving control section of actuator 7. Control circuit 50 in FIG. 1 comprises the following elements:

operation mode switching circuit 52 for switching an operation mode as per recording/reproducing request signal 49 supplied from external apparatus 51; and driver control circuit 53 for controlling combo driver 54 as per the operation mode determined by switching circuit 52.

Combo driver 54 is coupled to driver control circuit 53, and applies driving current 56 corresponding to current command "u" 55 to voice coil 10. In other words, combo driver 54 follows request signal 49 supplied from external apparatus 51 and determines an operation mode, then follows the operation mode and applies driving current "ia" to voice coil 10. Combo driver 54 also detects back electromotive voltage (bemf) 57 generated by voice coil 10 proportionately to the moving speed of actuator 7, and outputs it as a back electromotive voltage (BEMF) 58 to driver control circuit 53.

Next, an operation sequence at loading is demonstrated. In FIG. 1, operation mode switching circuit 52 follows request signal 49 supplied from external apparatus 51, and switches the operation mode to a loading mode. In response to operation mode signal 48, driver circuit 53 carries out the sequence flow of loading operation shown in FIG. 10.

The sequence flow of loading operation is demonstrated with reference to FIG. 10. The steps shown in FIG. 10 have their own process circuits some of which are not shown in FIG. 1-FIG. 11. In the step of outputting an urging pulse (step S61), driver control circuit 53 outputs current command 55 so that a pulsed current having a given pulse width can work on tab 8 such that the current urges tab 8 against second plane 14e. Then the urging pulse outputting circuit outputs a current command to apply an inversely oriented current to voice coil 10, and instantaneously processes a control loop (step S62). In the step of detecting a back electromotive voltage (step S63), back electromotive voltage signal (BEMF) 58 is obtained.

In the step of controlling a VCM speed (step S64), VCM speed control circuit 64 finds an actuator speed by using BEMF 58 obtained in step S63, and finds a speed difference between the actuator speed and a given target speed, then calculates a current command in response to the speed difference. A current-command outputting circuit outputs the current command calculated as a current command.

In the step of outputting a current command to combo driver 54 (step S65), a control command according to the speed difference is supplied to combo driver 54 based on the current command supplied from the current command outputting circuit.

In the step of determining a position (step S66), as per an availability of a reproducing signal supplied from the magnetic head, whether head slider 9 stays above recording medium 4 or on ramp section 14 is determined. A position determining circuit carries out this determination. While head slider 9 is determined that it stays on ramp section 14, the control loop process (step S62) is repeated. When head slider 9 is determined that it has arrived above medium 4, the control loop process (step S62) is ended. In the step of reporting the end of the process (step S67), the end of loading is reported to operation mode switching circuit 52.

The step of controlling the VCM speed (step S64) shown in FIG. 10 is detailed with reference to FIG. 11, which illustrates a speed control system in accordance with this first embodiment. The speed control system comprises the following elements:

driver control circuit 53;
combo driver 54; and
actuator 7.

Driver control circuit 53 is formed of VCM speed control circuit 64 which carries out step S64 (VCM speed control).

In FIG. 11, VCM speed control circuit 64 includes target setting circuit 68, comparator 70, phase compensation circuit 73, and speed detecting circuit 175. Circuit 68 outputs target speed ($\omega r$) 69. Comparator 70 finds a speed difference between target speed ($\omega r$) 69 and actual moving speed ($\omega$) 71. The speed difference is namely speed error (er) 72.

Phase compensation circuit 73 outputs current command (u) 55 in response to speed error (er) 72. Current control circuit 74 in combo driver 54 applies a driving current (ia) 56 proportionate to current command (u) 55 to voice coil 10 of actuator 7, thereby moving actuator 7.

Combo driver 54 includes current control circuit 74 and back electromotive voltage detecting circuit 75, which detects back electromotive voltage (bemf) 57 generated by voice coil 10 proportionately to the moving speed of actuator 7, and outputs back electromotive voltage signal (BEMF) 58 in response to back electromotive voltage (bemf) 57. Speed detecting circuit 175 calculates a moving speed of actuator 7 based on BEMF 58 supplied.

An operation of actuator 7 following the foregoing operation sequence is detailed hereinafter. A loading command supplied to the magnetic disk apparatus prompts actuator 7 to start loading, and at the same time, driver control circuit 53 applies a pulse-like driving current to voice coil 10 in step S61 (urging pulse outputting step) so that tab 8 is urged against second plane 14e, i.e. the refuge place. At this time, resilient force of leaf spring 24 generates vertical stress to second plane 14e.

Next, the direction of the current running through voice coil 10 is reversed in response to the responsiveness (resiliency) of actuator 7 with respect to the spring. Tab 8 thus jumps from second plane 14e and overrides first step riser 14d because of the following two forces: (a) the repulsive force due to the spring resilient force generated against the urging force which urges leaf spring 24 against second plane 14e, and (b) the repulsive driving force of voice coil 10 due to the reversing of the current direction. At the same time, actuator 7 obtains moving force toward the loading direction and moves toward medium 4. In step S62 (loop control), when head slider 9 is determined arriving above medium 4, the speed control system shown in FIG. 11 works on actuator 7 to move via operation mode switching circuit 52, so that the magnetic head mounted to actuator 7 arrives at a target place.

FIG. 12 shows a relation between a movement amount of tab 8 moving vertically with respect to second plane 14e and a driving current amount limited and applied to voice coil 10 toward the load direction. The relations are measured in two ways; namely, with an urging pulse and without the urging pulse. In FIG. 12, the lateral axis represents a driving current (mA) and the vertical axis represents a maximum vertical moving amount (mm) of tab 8.

As FIG. 12 clearly tells, at starting the loading, an urging pulsed current is applied to voice coil 10, and the responsiveness of actuator 7 to the spring is used, so that the current applied to voice coil 10 for releasing actuator 7 staying at the refuge place from the latch can be smaller than that of the case applying no urging pulsed current. Therefore, use of the urging pulsed current can produce a great advantage for saving power of the magnetic disk apparatus.

As discussed above, the first exemplary embodiment proves that the first step riser or the second step riser provided to the ramp section can prevent the tab from moving if the disk apparatus receives an external great shock while the actuator is kept at the refuge place. As a result, the tab can be positively held on the second plane of the ramp section.

An operation starting command is supplied to the disk apparatus of which actuator stays at the refuge place, and the actuator starts loading. At this time, an urging pulsed current is applied to the voice coil of the actuator. A smaller amount of current applied to the voice coil is enough for the tab to leave the ramp block because of a synergistic action of the following two factors: (a) the repulsive force due to the spring resilient force, generated by the urging pulsed current, against the urging force which urges leaf spring 24 against the second plane, and then (b) the repulsive driving force of the VCM generated by applying the current running reversal to the urging pulsed current. As a result, power saving in the magnetic disk apparatus is achievable.

The foregoing structure needs no extra members for holding the actuator at the refuge place, so that the number of elements forming the actuator holding device can be reduced, which lowers the cost, and thus an inexpensive and power-saving disk apparatus is obtainable.

Embodiment 2

Figure 13:
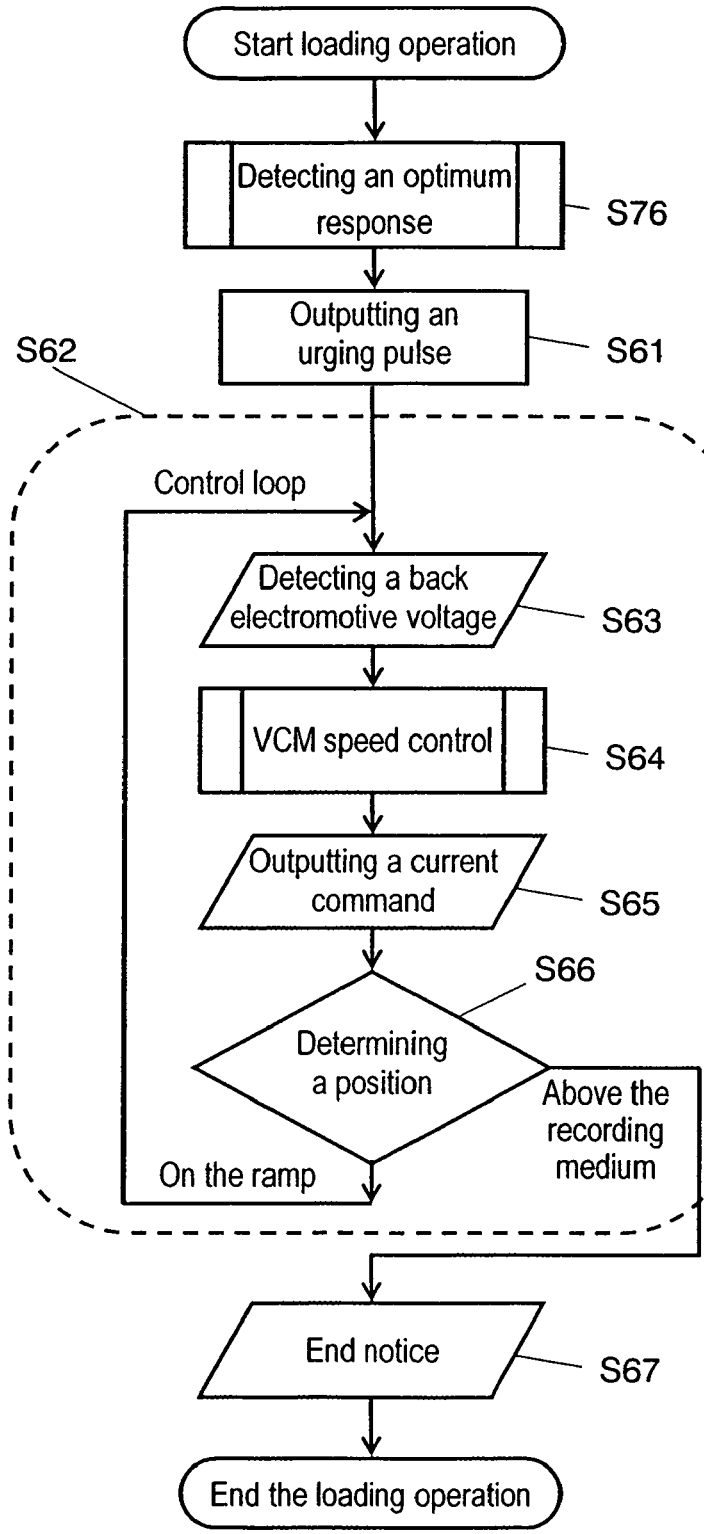
FIG. 13 illustrates a method of controlling an actuator, and shows a sequence flowchart of controlling the actuator at releasing a latch of a disk apparatus in accordance with a second embodiment of the present invention.
Figure 14:
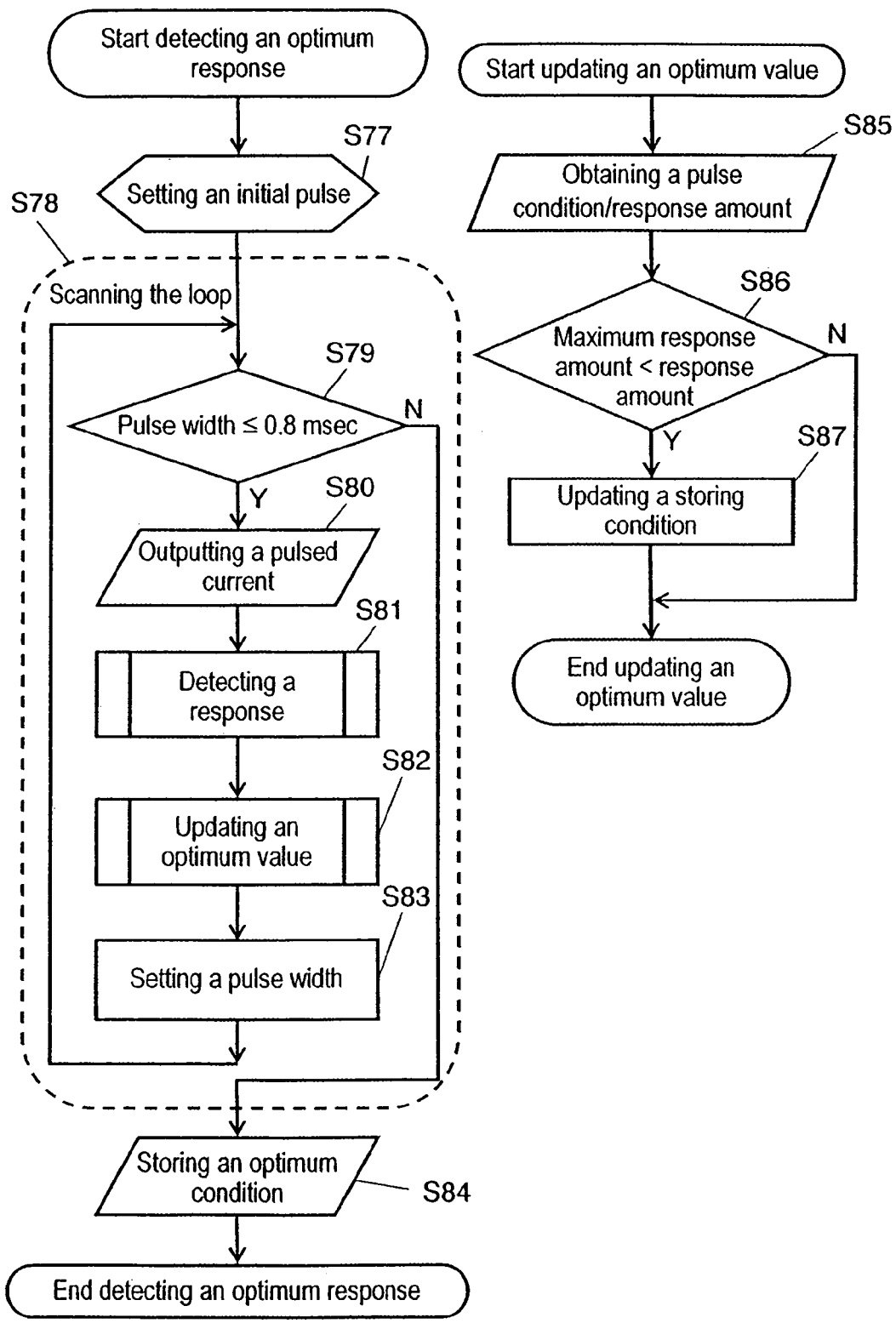
FIG. 14A shows a flowchart illustrating a process of an optimum response detecting circuit of the disk apparatus in accordance with the second embodiment.
FIG. 14B shows a flowchart illustrating a process of updating an optimum value of the disk apparatus in accordance with the second embodiment.
Figure 15:
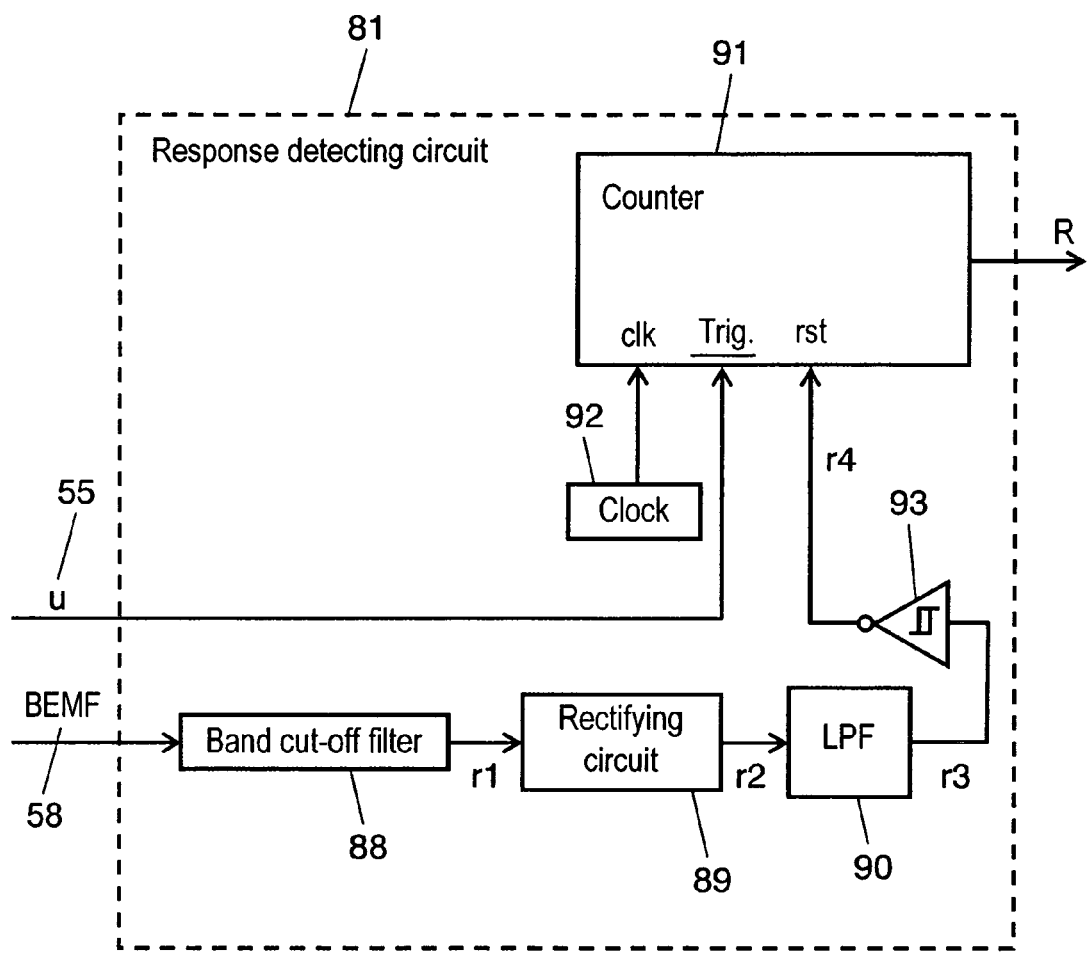
FIG. 15 shows a block diagram illustrating a response detecting circuit of the disk apparatus in accordance with the second embodiment.

FIG. 13-FIG. 16 illustrate a method of controlling an actuator in accordance with the second exemplary embodiment. FIG. 13 shows a sequence flowchart illustrating a method of controlling the actuator when a latch is released in a disk apparatus. FIG. 14A shows a sequence flowchart illustrating a process of an optimum response detecting circuit of the disk apparatus. FIG. 14B shows a sub-sequence flowchart illustrating a process of updating an optimum value of the disk apparatus. FIG. 15 shows a block diagram illustrating a response detecting circuit of the disk apparatus. FIG. 16A shows a waveform of an operating signal in an optimum pulse setting circuit of the disk apparatus. FIG. 16B shows an enlarged waveform of the dotted section shown in FIG. 16A.

As previously discussed in the first embodiment, use of repulsive force due to the vertical responsiveness of leaf spring 24 allows actuator 7 to efficiently override first step riser 14d. However, this repulsive force due to the responsiveness of leaf spring 24 differs in every disk apparatus because of dispersion of structural elements such as leaf spring 24, voice coil 10. The feature of this second embodiment is to absorb the difference between each apparatus by applying an urging pulsed current having an optimum pulse width, which is to be found before releasing a latch.

In the following steps, the processes are done in respective process circuits, some of which are not shown in FIG. 1-FIG. 15. In FIG. 13, in the step of detecting an optimum response (step S76), a pulse condition is measured, with which actuator 7 shows the maximum response to a pulsed current which moves actuator 7 toward an unload direction. In the step of outputting an urging pulse (step S61), a condition of outputting the pulse is set.

The steps onward from the step of outputting an urging pulse (step S61) shown in FIG. 13 remain unchanged from those in FIG. 10, so that the descriptions thereof are omitted here. Only the points different from the first embodiment are described hereinafter.

Detection of an optimum response (step S76) is demonstrated with reference to the flowchart shown in FIG. 14A. The optimum response detecting circuit comprises the following elements: an initial pulse setting circuit; a pulse-width comparing circuit; a pulsed current outputting circuit; a response detecting circuit; an optimum value updating circuit; a pulse-width setting circuit; and an optimum condition storing circuit. In addition to these circuits, the optimum response detecting circuit includes a loop scanning process circuit, which repeats scanning the loop until the pulse width agrees with a given pulse width through feeding back a new pulse width as a present pulse width to the pulse-width comparing circuit for determining whether or not the present pulse width agrees with the given pulse width.

In FIG. 14A, the step of setting an initial pulse-width (step S77) carries out an initialization, namely, a pulse condition to be supplied firstly from the step (step S78) of scanning the loop is set in step S77.

In the step of comparing a pulse-width (step S79), the pulse-width is confirmed and whether or not the pulse-width is narrower than the given pulse-width, i.e. 0.8 msec, is determined. The pulse-width not greater than 0.8 msec allows the step to remain in the loop scanning step (S78), and the pulse-width over 0.8 msec allows ending the step S78.

In the step of outputting a pulsed current (step S80), current command (u) 55 is issued under the pulse condition set in combo driver 54 shown in FIG. 1, and pulsed driving current (ia) 56 is to flow through voice coil 10.

In the step of detecting a response (step S81), a response is detected, and a response amount of actuator 7 to pulsed driving current 56 is calculated by using back electromotive voltage signal (BEMF) 58.

In the step of updating an optimum value (step S82), when the present response amount found by response detecting circuit 81 is greater than the stored response amounts, namely, greater than the maximum response amount of the response amounts hitherto found in step S81, the optimum value is updated with the present response amount and the present pulse condition.

Updating an optimum value (step S82) is detailed hereinafter with reference to the sub-sequence shown in FIG. 14B. The optimum value updating circuit includes a pulse-condition and response-amount obtaining circuit, a response amount comparing circuit, and a storing-condition updating circuit.

In the step of inputting a present condition (step S85) shown in FIG. 14B, a present pulse condition and a present response amount are obtained. In the step of comparing response amounts (step S86), the maximum response amount stored is compared with the present response amount, and when the present one is smaller than the maximum one, no process is done before the step S82 is ended. When the present one is greater than the maximum one, the stored condition is updated with the present one as a new maximum one and the present pulse condition as an optimum pulse condition.

As shown in FIG. 14B, the optimum updating process (step S82) can find the pulse condition, with which the maximum response characteristics is obtainable, from among the pulse conditions ranging from the initial pulse condition to the present one.

In the step of setting a pulse-width (step S83) shown in FIG. 14A, a pulse width of the pulse to be output next, namely, a given value=20 μsec, is added to the present pulse width, thereby obtaining a new pulse width.

In the step of storing an optimum condition (step S84), after the loop scanning (step S78) the determined optimum condition is stored. As the foregoing discussion tells, the loop scanning (step S78) shown in FIG. 14A changes the pulse width from an any value smaller than 0.8 msec to 0.8 msec in 20 μsec steps, so that the pulse width condition, with which the maximum response amount is obtainable, can be found.

FIG. 15 shows a block diagram illustrating a structure of response detecting circuit 81 in accordance with the second embodiment. In FIG. 15, band cut-off filter 88 cuts DC offset of BEMF 58 supplied and a noise component of high frequency, and outputs the resultant remainder as response signal "r1". BEMF 58 is made corresponding to bemf 57 that is generated by back electromotive voltage detecting circuit 75.

Rectifying circuit 89 rectifies response signal "r1" and outputs rectified signal "r2". Low-pass filter (LPF) 90 outputs envelope signal "r3" of rectified signal "r2". Schmitt trigger 93 outputs trigger signal "r4" when envelope signal "r3" attenuates to a predetermined level. Counter 91 receives pulsed current command (u) 55, trigger signal "r4" and clock 92. A period between the reception of current command (u) 55 at counter 91 and the attenuation of signal "r3" is measured based on clock 92, then counter 91 outputs the measured amount as response amount R.

Figure 16A:
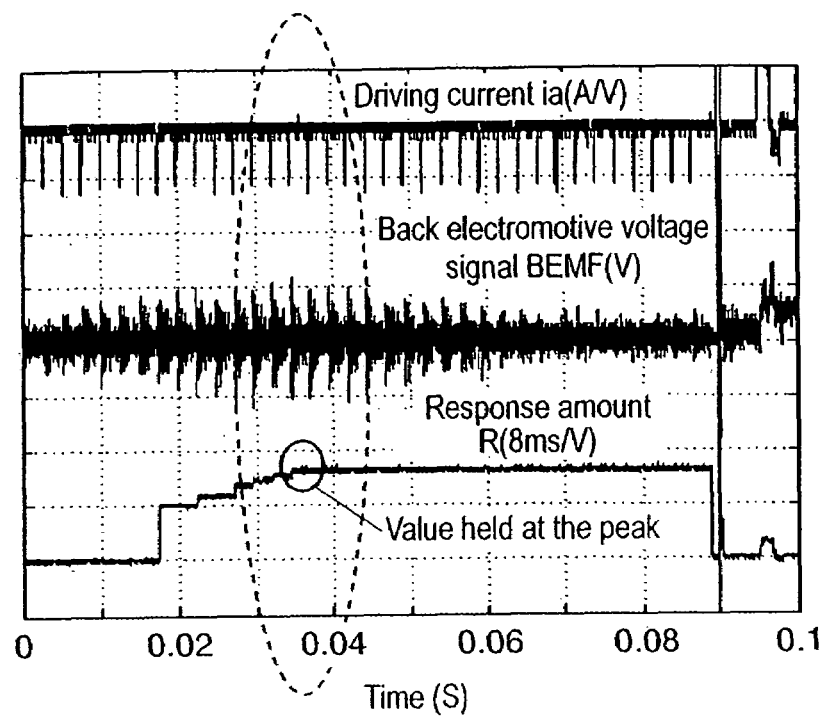
FIG. 16A shows a waveform of an operating signal in an optimum pulse setting circuit of the disk apparatus in accordance with the second embodiment.

FIG. 16 shows waveforms of respective signals in the magnetic disk apparatus executing the foregoing optimum response detecting sequence. In FIG. 16A, pulsed driving current (ia) 56 is supplied every 5 milliseconds (msec) with the pulse width being increased from 0 sec to 0.8 msec in 20 μsec steps. The responsiveness of actuator 7 to pulsed driving current (ia) 56 is indicated as back electromotive voltage signal (BEMF) 58 processed in the step of detecting a back electromotive voltage (step S63). Response amount "R", shown in the dotted line and corresponding to the maximum response point of BEMF 58, is indicated as the value held at the peak.

Figure 16B:
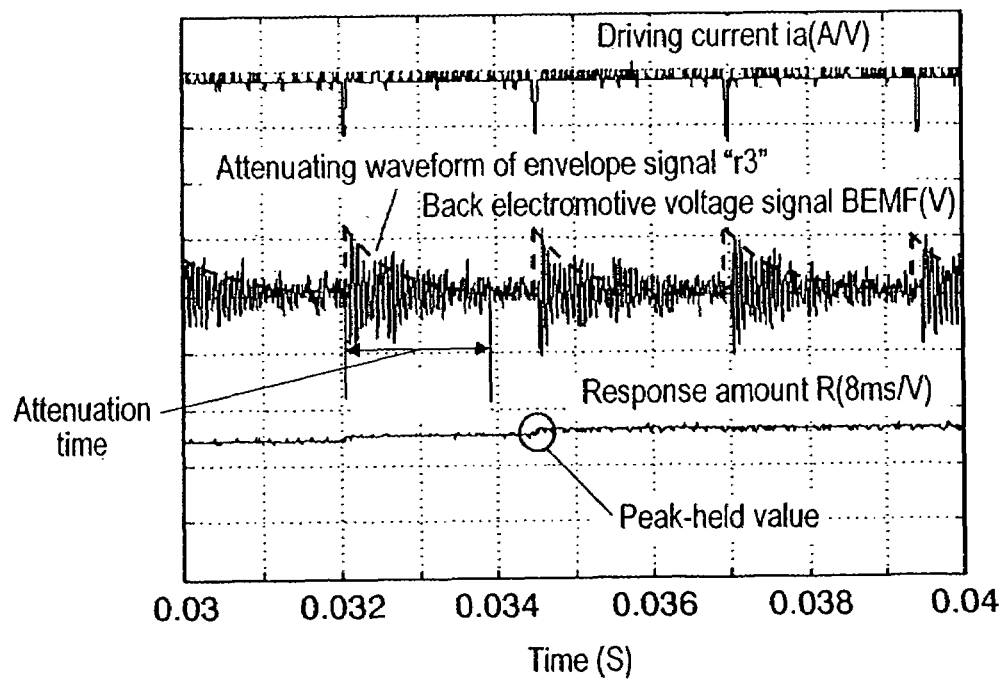
FIG. 16B shows an enlarged waveform of the dotted section shown in FIG. 16A.

FIG. 16B shows an enlarged waveform surrounded with the dotted line shown in FIG. 16A, and illustrates an attenuating waveform of envelope signal "r3" corresponding to BEMF 58.

As discussed above, the second embodiment can obtain an advantage similar to that of the first embodiment. On top of that, when an operation starting command is supplied to the disk apparatus of which actuator is held or latched at the refuge place, the actuator starts loading. At this time the following control can be done: before releasing the latch, the pulsed driving current, which is used for detecting response characteristics, is applied to the voice coil with the pulse width being changed, and response amount "R" of the actuator to the driving current is detected. Then the maximum response amount is scanned, and a pulse-width condition corresponding to the maximum response amount is found, then an optimum pulse-width condition for outputting an urging pulse is found. This mechanism allows releasing the latch in response to an unexpected accident such as dispersion of structural elements of the actuator such as the leaf spring and others or characteristics deterioration due to environmental changes. Besides, a smaller amount of current applied to the voice coil is enough for releasing the actuator held at the refuge place, so that power efficiency can be improved.

Embodiment 3

Figure 17A:
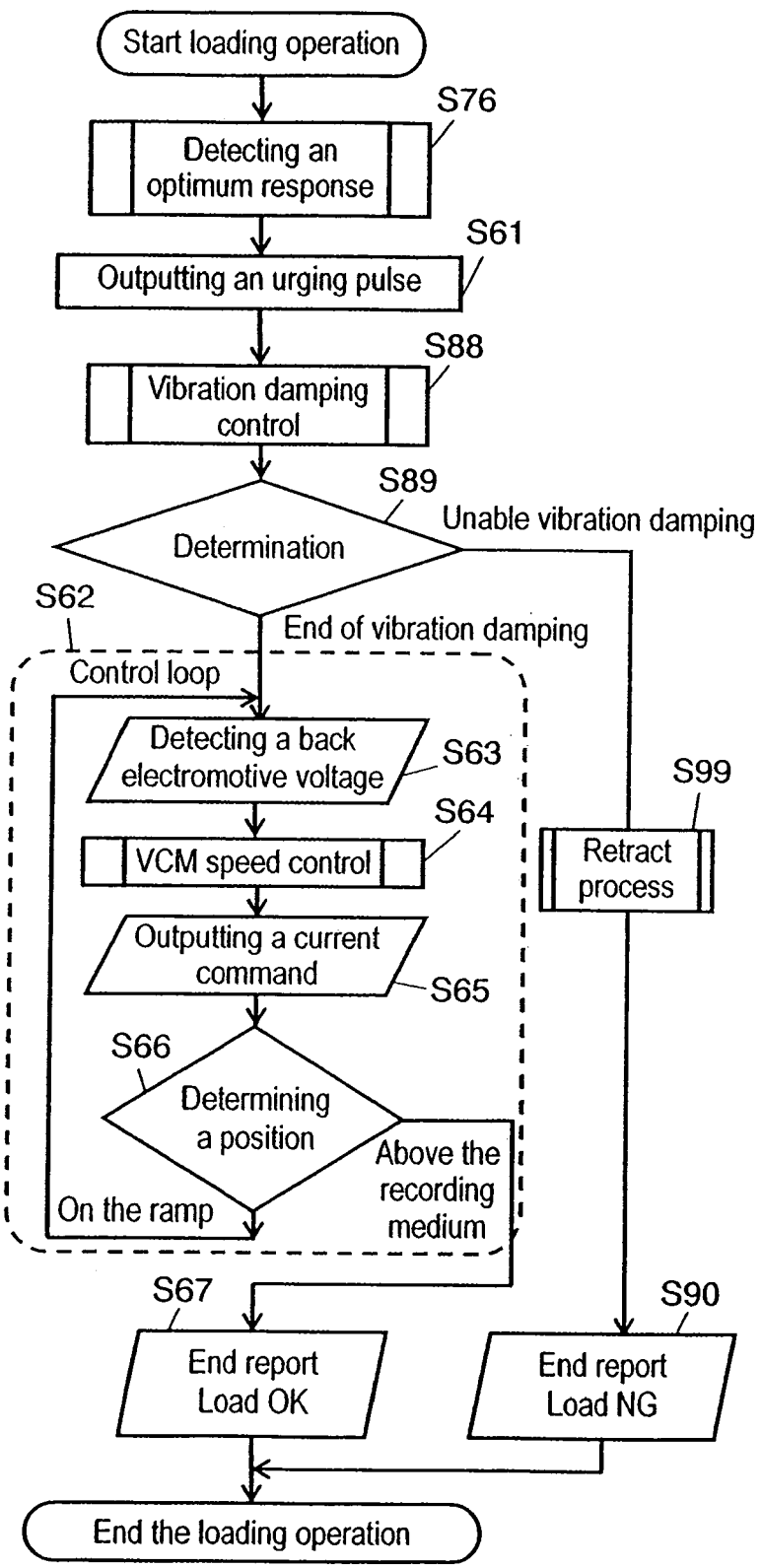
FIG. 17A illustrates a method of controlling an actuator, and shows a sequence flowchart of controlling the actuator at releasing a latch of the disk apparatus in accordance with a third embodiment of the present invention.
Figure 17B:
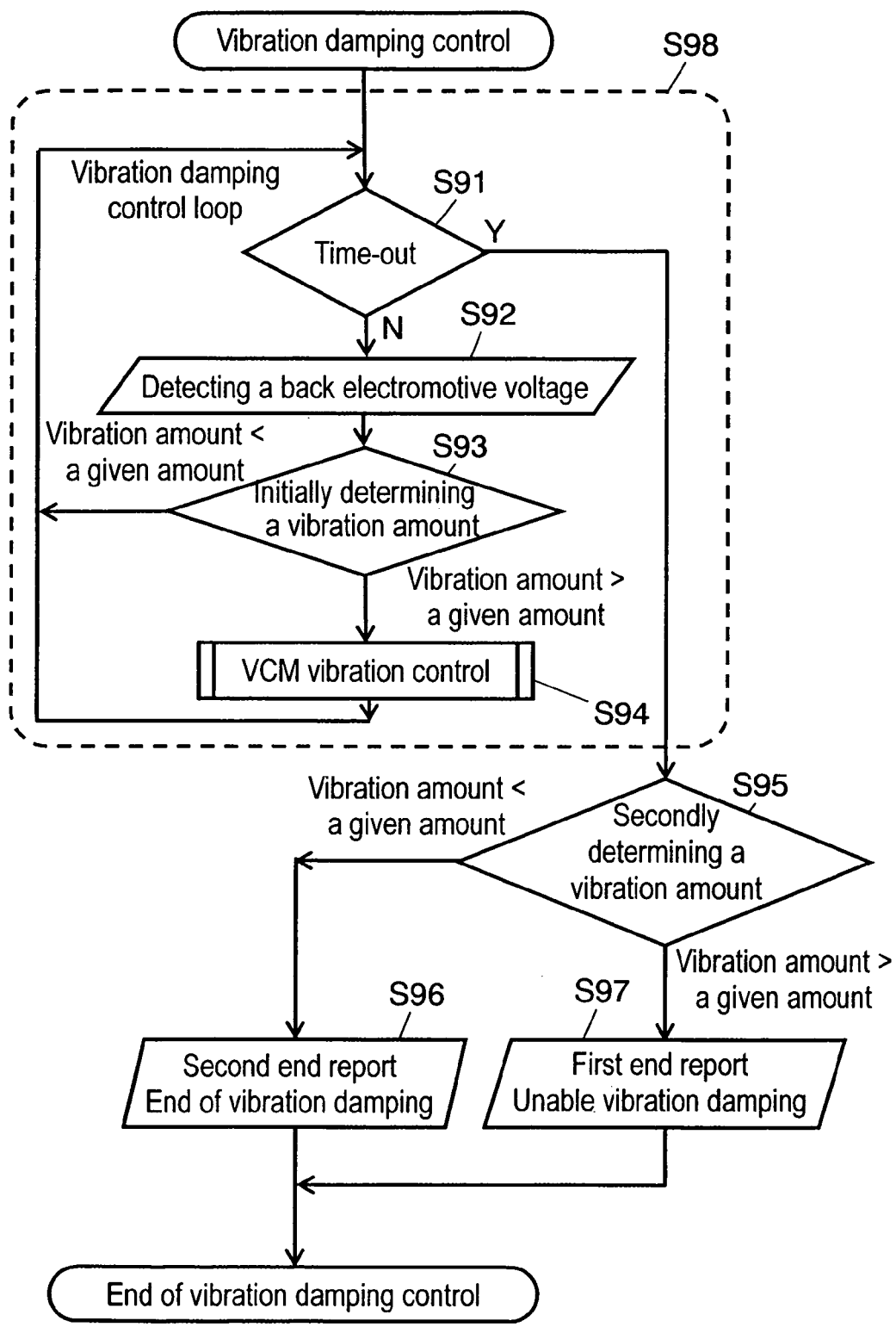
FIG. 17B shows a flowchart illustrating a process of vibration damping control of the actuator in accordance with the third embodiment.
Figure 18:
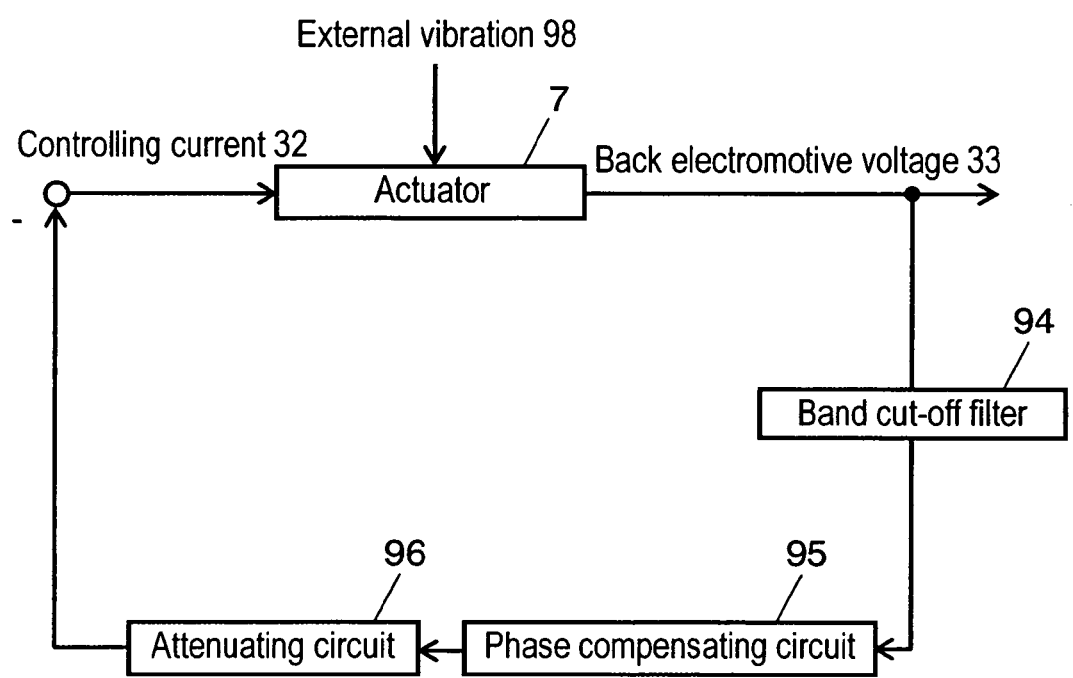
FIG. 18 shows a block diagram illustrating a vibration control of a VCM in accordance with the third embodiment.
Figure 19A:
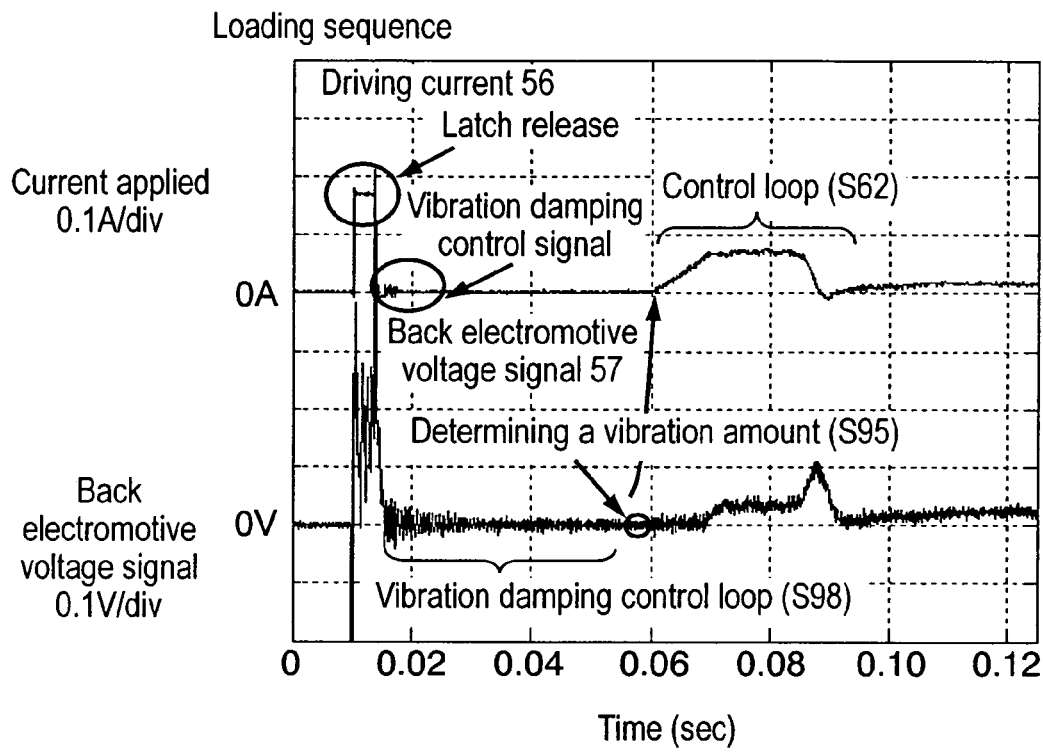
FIG. 19A shows a control waveform indicating measured values of input and output control signals in accordance with the third embodiment.
Figure 19B:
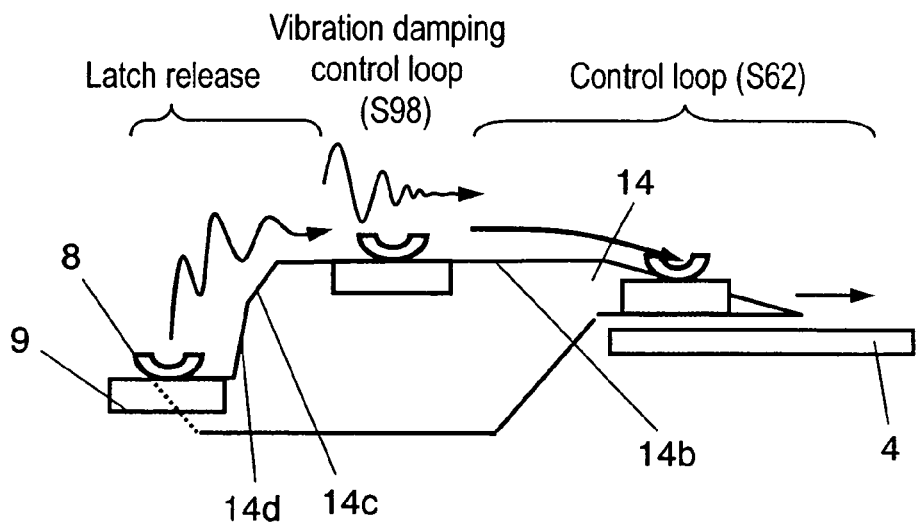
FIG. 19B shows an operation of a tab of the actuator around a ramp section in accordance with the third embodiment.
Figure 20A:
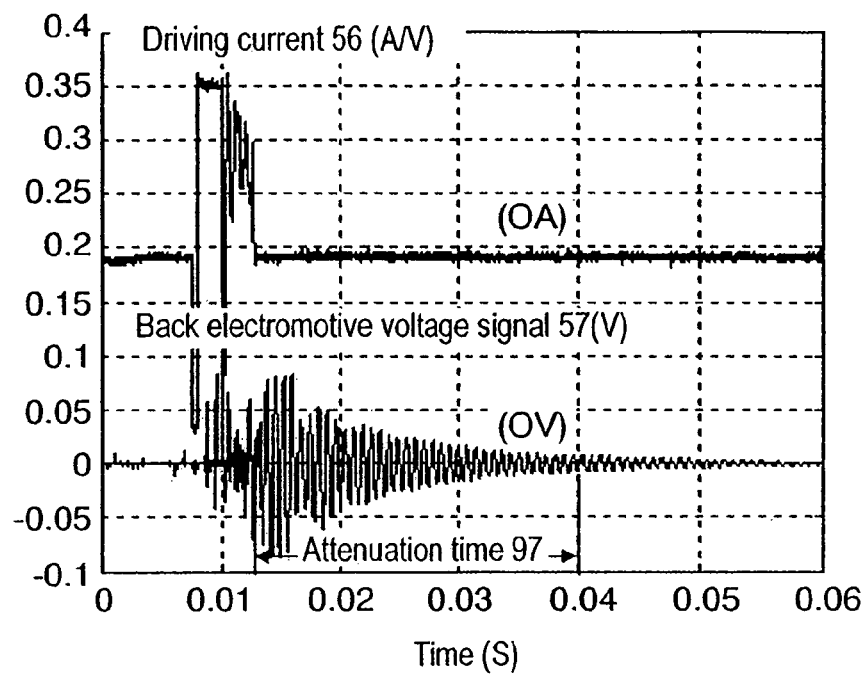
FIG. 20A shows a waveform illustrating an effect of vibration control in accordance with the third embodiment without using a vibration damping control circuit.
Figure 20B:
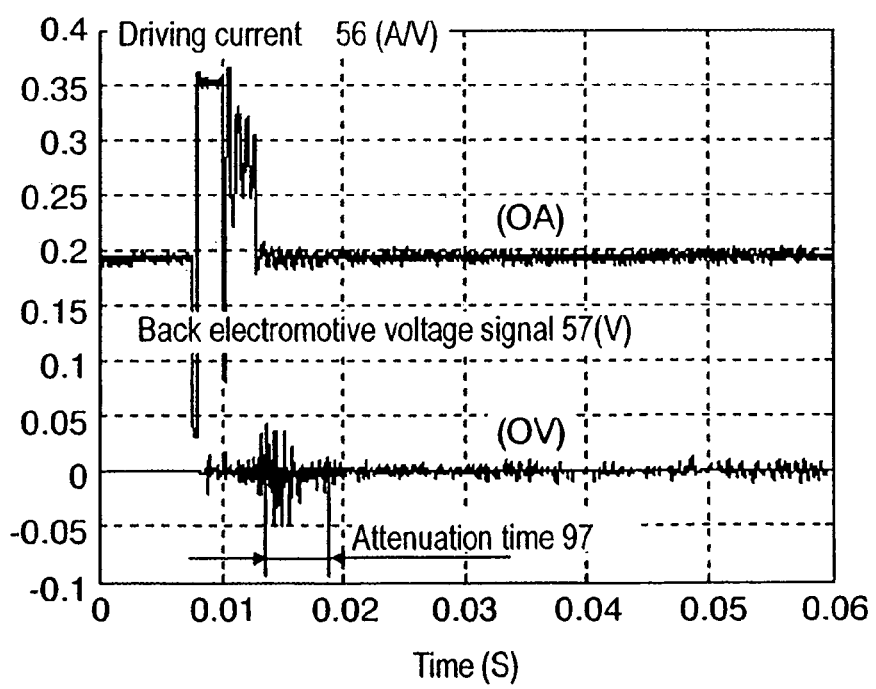
FIG. 20B shows a waveform illustrating an effect of vibration control in accordance with the third embodiment using a vibration damping control circuit.

FIG. 17-FIG. 20 illustrate a method of controlling an actuator in accordance with the third exemplary embodiment of the present invention. FIG. 17A shows a sequence flowchart of controlling the loading operation at releasing a latch of the actuator. FIG. 17B shows a sequence flowchart of vibration damping control on the ramp section immediately after the release of the latch. FIG. 18 shows a block diagram illustrating the vibration damping control in accordance with the third embodiment. FIG. 19A shows a waveform indicating measured values of input and output control signals actually used in the third embodiment. FIG. 19B shows schematically an operation of a tab of the actuator around the ramp section. FIGS. 20A and 20B show effects of the vibration damping to the actuator, and FIG. 20 shows a waveform without using a vibration damping control circuit. FIG. 20B shows a waveform using the vibration damping control circuit.

As previously discussed in the first embodiment, use of repulsive force due to the vertical responsiveness of leaf spring 24 allows actuator 7 to efficiently override first step riser 14d. Also as discussed in the second embodiment, an optimum value of the urging pulsed current is found before releasing the latch, then the urging pulsed current having the optimum pulse width is applied, which results in the following advantage: respective actuators of disk apparatuses have differences in repulsive force due to the responsiveness to the spring of the respective actuators because of the dispersion of leaf spring 24 and voice coil 10. The foregoing method can absorb the differences. However, the repulsive force due to the responsiveness of actuator 7 vibrates leaf spring 24 fiercely, and if actuator 7 and head slider 9 disposed at the tip of actuator 7 carry out the loading operation above recording medium 4 as they keep vibrating, head slider 9 hits medium 4, and sometimes both of them can be damaged.

To overcome such a problem, this third embodiment detects residual vibration on first plane 14b of ramp section 14 at releasing the latch of head slider 9, and after this vibration is attenuated, head slider 9 starts loading above medium 4. This is a feature of the third embodiment.

To be more specific, this third embodiment adds a step of controlling the vibration damping (step S88), for detecting and attenuating the vibration of head slider 9, to the flowchart shown in FIG. 13 of embodiment 2, specifically between the step of outputting an urging pulse (step S61) and the step of loop control (step S62). Therefore, the step of detecting an optimum response (step S76), the step of outputting an urging pulse (step S61), the step of loop control (step S62) and the steps onward remain unchanged from embodiment 2, and the descriptions thereof are omitted here. Only the points different from embodiment 2 are described hereinafter.

In FIG. 17A, after the output of an urging pulse (step S61), at releasing tab 8 of actuator 7 from the latch, namely, when tab 8 leaves second plane 14e and arrives at first plane 14b, the driving current supplied to voice coil 10 is temporarily cut off, and the vibration damping control is carried out (step S88).

FIG. 17B shows a flowchart illustrating the sequence carried out in the step of vibration damping control (step S88). In FIG. 17B, the time-out process (step S91) is done in a time-detecting circuit, and continuation of this process in a given time prompts the loop of vibration damping (S98) to end.

What is done in the loop of vibration damping (S98) is detailed hereinafter: in the step of detecting a back electromotive voltage (step S92), a back electromotive voltage generated on voice coil 10 of actuator 7 is detected. In the step of initially determining a vibration amount (step S93), whether or not the vibration generated in actuator 7 exceeds a given amount is determined by using the back electromotive voltage detected in step S92.

When the vibration exceeding the given amount is acknowledged, VCM vibration control (step S94) is carried out, and its result is returned to the time-out process (step S91). Then step S92 is carried out again, and a vibration amount of actuator 7 is determined in step S93. If the vibration amount is less than the given amount, step S91, step S93 and step S91 are repeated until a predetermined time passes in the time-out process (step S91). When the vibration amount of actuator 7 exceeds the given amount, VCM vibration control (step S94) is carried out, and the result is returned to the time-out process (step S91). Then step S91, step S93, step S94 and step S91 are repeated until a given time passes in step S91.

If vibration less than the given amount is acknowledged on actuator 7, skip the step of VCM vibration control (step S94), and repeat step S91, step S93, and step S91 until a given time passes in the time-out process (step S91).

When the given time passes in step S91, a final value of the back electromotive voltage detected in the step of detecting a back electromotive voltage (step S92) is supplied to the step of secondly determining a vibration amount (step S95).

FIG. 18 shows a block diagram illustrating a process of VCM vibration control (step S94). In FIG. 18, back electromotive voltage 33 induced by actuator 7 extracts vibrations of the resonance frequency band expected for actuator 7 by using band cut-off filter 94. Phase compensating circuit 95 works as a phase compensate filter for assuring the stability of the control system. Attenuating circuit 96 is an output limiter, and if actuator 7 keeps vibrating over the due attenuation period, attenuating circuit 96 prevents harmful effects or spillover due to excessive feedback in the vibration control system caused by limiting an output value. Further, if actuator 7 receives great external vibration 98, attenuating circuit 96 can detect the vibration amount by using back electromotive voltage 33 generated on the voice coil. This detection prompts the VCM vibration control (step S94) to work, and a retract process (step S99) is carried out by vibration damping control (step S98), so that actuator 7 moves along the unloading direction. If the foregoing great external vibration 98 is applied to actuator 7, the loading of actuator 7 can be prohibited, though it is not illustrated in the drawings.

In FIG. 17B, the step of secondly determining a vibration amount (step S95) issues a first end report (step S97) for reporting failure in vibration damping if the final value of the back electromotive voltage detected in step S92 indicates the presence of the vibration exceeding the given value. If the final value tells the presence of the vibration less than the given value, a second end report (step S96) is issued for reporting success in vibration damping.

In FIG. 17A, the step of determination (step S89) determines whether it carries out the step of loop control S62 or the step of retract (step S99) as per the report of ending the vibration damping, which is given by one of the second end report (step S96) or the first end report (step S97). To be more specific, loop control S62 is carried out as per the second end report (step S96), and the retract process (step S99) is carried out as per the first ending report(step S97). The step of determination (step S89) includes a control switching circuit which switches the control sequence to either one of loop control S62 or the retract (step S99) in response to the vibration amount of actuator 7, which vibration amount is detected by the back electromotive voltage generated on voice coil 10. In the step of retract process (step S99), a definite amount of current is applied to voice coil 10 so that actuator 7 moves to the other side from (away from) recording medium 4, and tab 8 returns to second plane 14e, thereby preventing the collision between head slider 9 and medium 4. The step of issuing an end report (step S90) issues a notice of Load NG for ending the loading operation.

In FIG. 19A, driving current (ia) 56 indicates an amount of current applied to voice coil 10 of actuator 7, and the current amount on the (+) side with respect to 0 (zero) ampere (A) moves actuator 7 toward the recording medium, and that on the (−) side moves actuator 7 toward the other side from (away from) the medium. Back electromotive voltage (bemf) 57 is induced on voice coil 10, and its cyclic variation substantially agrees with the vibration of actuator 7.

In FIGS. 19A and 19B, when driving current (ia) 56 is applied to voice coil 10 for starting the loading operation, the repulsive force due to the responsiveness of actuator 7 vibrates leaf spring 24, and the vibration causes tab 8 to vibrate and override first step riser 14d and second slope 14c, and actuator 7 is released from the latch, so that tab 8 rides on first plane 14b. At this time, the application of the driving current to voice coil 10 is temporarily cut off, and the loop of vibration damping control (S98) starts working, so that the vibration of tab 8 on first plane 14b is damped. The step of secondly determining a vibration amount (step S95) in the vibration damping control (step S88) issues a report of ending the vibration damping (step S96), and the end of vibration damping is determined (step S89), then the loop control (S62) is carried out. Actuator 7 is thus moved toward recording medium 4, and head slider 9 arrives above medium 4.

Next, an effect of the vibration damping control (step S88) is described hereinafter. FIG. 20A shows measured values of the back electromotive voltages of voice coil 10 without using the vibration damping control in accordance with the third embodiment. FIG. 20B shows measured values of the back electromotive voltages of voice coil 10 using the vibration damping control in accordance with the third embodiment. Attenuation time 97 indicates the time needed until the vibration of actuator 7 attenuates. Attenuation time 97 shown in FIG. 20A is a time constant depending on the mechanical construction of actuator 7, and it is the due time needed until the vibration attenuates spontaneously. FIG. 20A tells that introduction of the vibration damping control (step S88) greatly shortens attenuation time 97.

As discussed above, the third embodiment proves that an advantage similar to that of the first and the second embodiments can be obtained. On top of that, the residual vibration on the actuator due to the release of the latch can be attenuated quickly, so that danger of a collision between the head slider and the recording medium can be avoided, and damages of both the head slider and the medium can be prevented. The actuator can be designed on the premise that the vibration damping control is carried out, so that there is no need to give extra consideration to the residual vibration after the latch release. In order to efficiently release the latch, the actuator can be designed specifically giving consideration to its spring characteristics. The circuit detecting a vibration amount by using the back electromotive voltage generated on the voice coil can also detect movement of the actuator caused by external vibrations. This structure thus allows the actuator to stop the loading operation, or allows carrying out the retract process, or prohibiting the loading operation when the actuator or the disk apparatus vibrates greatly due to the external vibrations. As a result, the disk apparatus can be prevented from being damaged by vibrations.

In the embodiments previously discussed, a magnetic disk apparatus is used; however, the present invention is not limited to this one, and a non-contact disk apparatus such as a magneto optic disk apparatus or an optical disk apparatus can be used.

What is claimed is:

1. A disk apparatus comprising:
   (a) a head supporting arm having a tab at a tip of a first end of the arm and a head slider at the first end, which head slider has a signal converting element for recording and reproducing a signal on and from a recording medium, and a voice coil at a second end of the arm;
   (b) an actuator supporting the head supporting arm rotatably around a horizontal rotating shaft for rotating in parallel with a surface of the recording medium and around a vertical rotating shaft for rotating vertically with respect to the surface of the recording medium, and supported by a resilient member placed around the vertical shaft, which the resilient member energizes the actuator vertically toward the recording medium;
   (c) a voice coil motor including;
      (c-1) a pair of yokes placed sandwiching the voice coil vertically and confronting the voice coil;
      (c-2) a magnet fixed to at least one of the yokes,
   (d) a ramp block including;
      a ramp section and a refuge place both on which the tab of the head supporting arm slides; and
   (e) an actuator control circuit which applies a driving current to the voice coil so that the tab held at the refuge place is urged against a second plane of the refuge place in the ramp block, then applies another driving current to the voice coil so that the tab can leave the second plane, thereby moving the head slider disposed to the actuator from the ramp block toward the recording medium.

2. The disk apparatus of claim 1, wherein the actuator control circuit includes:
   (e-1) an urging pulse outputting circuit which issues a current command such that the driving current applied to the voice coil works to urge the tab against the second plane, then issues another current command to apply another driving current flowing in a reversal direction to the driving current flowing along the urging direction;
   (e-2) a back electromotive voltage detecting circuit for detecting a back electromotive voltage generated on the voice coil and outputting a back electromotive voltage signal;
   (e-3) a control circuit over a voice coil motor (VCM) speed for finding a speed difference between an actual moving speed, obtained from the back electromotive voltage, of the actuator and a given target speed, and calculating a current command in response to the speed difference;
   (e-4) a current command outputting circuit for outputting the current command calculated in the VCM speed control circuit as a current command; and
   (e-5) a position determining circuit for determining whether the head slider stays above the recording medium or on the ramp section of the ramp block by using a reproduced signal supplied from the signal converting element.

3. The disk apparatus of claim 2, wherein the VCM speed control circuit includes:
   (e-3-1) a target setting circuit for outputting the given target speed;
   (e-3-2) a speed detecting circuit for calculating the actual moving speed of the actuator by using the back electromotive voltage signal obtained by detecting the back electromotive voltage generated on the voice coil;
   (e-3-3) a comparing circuit for comparing the target speed with the actual moving speed for detecting the speed difference; and
   (e-3-4) a phase compensating circuit for outputting the current command in response to the speed difference.

4. The disk apparatus of claim 1, wherein the actuator control circuit applies the driving current to the voice coil for urging the tab against the second plane, which driving current is a pulsed driving current.

5. The disk apparatus of claim 4, wherein the actuator control circuit further includes an optimum response detecting circuit that stores a pulse width with which a maximum response amount of the actuator is obtained in response to the pulsed driving current applied to the voice coil, and outputs the pulsed driving current having the pulse width to the voice coil.

6. The disk apparatus of claim 5, wherein the optimum response detecting circuit comprises:
an initial pulse-width setting circuit for initializing a pulse condition of the pulsed driving current that is firstly supplied from the optimum response detecting circuit;
a pulse-width comparing circuit for confirming a pulse-width of the pulsed driving current applied to the voice coil, and determining whether the pulse-width is smaller than a given pulse-width;
a pulsed current outputting circuit for outputting a current command having the pulsed-width, and applying the pulsed driving current to the voice coil when the pulse-width is determined smaller than the given pulse-width;
a response detecting circuit for calculating a response amount of the actuator to the pulsed driving current by using the back electromotive voltage generated on the voice coil;
an optimum value updating circuit for comparing the response amount calculated with the stored response amount, and updating an optimum value with whichever the amount greater than the other one and a pulse condition of the greater one, then storing the updated amount and the pulse condition;
a pulse-width setting circuit for inputting a new pulse-width, which is formed by adding a given width to the pulse-width, to the pulse-width comparing circuit, and the pulse-width setting circuit including;
an optimum condition storing circuit in the pulse-width comparing circuit for confirming the response amount and the pulse condition both stored in the optimum value updating circuit as an optimum condition, and storing this optimum condition; and
a loop scanning circuit for feeding back a newly set pulse-width as a present pulse-width to the pulse-width comparing circuit, which determines whether or not the present pulse-width is smaller than the given pulse-width, and repeats scanning the loop until the present pulse-width reaches the given pulse width.

7. The disk apparatus of claim 6, wherein the optimum value updating circuit includes:
a pulse condition and response amount obtaining circuit for obtaining a pulse condition at present and a response amount at present;
a response amount comparing circuit for comparing a stored maximum response amount with the response amount at present;
a storing condition updating circuit for updating a stored condition value with an optimum condition that includes a present response amount as a maximum response amount and a present pulse condition as an optimum pulse condition when the response amount at present is greater than the stored maximum response amount, and maintaining the stored condition value as an optimum value without updating when the response amount at present is smaller than the maximum response amount.

8. The disk apparatus of claim 1, wherein the actuator control circuit further comprises:
a vertical vibration amount detecting circuit for cutting off the driving current temporarily and detecting vertical vibration amount of the actuator by using a back electromotive voltage signal generated on the voice coil when the tab is released from latch and stays on a first plane of the ramp section; and
a control switching circuit for switching a control sequence in response to the vertical vibration amount.

9. The disk apparatus of claim 8, wherein the actuator control circuit further comprises a vibration damping circuit for attenuating the vertical vibration of the actuator through feeding back an amount detected by the vertical vibration detecting circuit.

10. The disk apparatus of claim 8, wherein as far as an amount detected by the vertical vibration detecting circuit stays greater than a given amount, the control switching circuit of the actuator control circuit stops the head slider from moving from the ramp block toward the recording medium, then making the actuator retract.

11. A method of controlling an actuator of a disk apparatus that comprises:
(a) the actuator including:
a head supporting arm having a tab on a first end of the arm;
a head slider having a head which records and reproduces a signal on and from a recording medium; and
a voice coil,
wherein the actuator supports the head supporting arm rotatably around a horizontal rotating shaft for rotating in parallel with a surface of the recording medium and around a vertical rotating shaft for rotating vertically with respect to the surface of the recording medium, and is supported by a resilient member placed around the vertical shaft, which member energizes the actuator vertically toward the recording medium,
(b) a voice coil motor;
(b-1) a pair of yokes placed sandwiching the voice coil vertically and confronting the voice coil;
(b-2) a magnet fixed to at least one of the yokes,
(c) a ramp block including;
(c-1) a ramp section on which the tab of the head supporting arm touches and slides;
(c-2) a refuge place,
the method of controlling the actuator at starting loading operation of the disk apparatus, and the method comprising the steps of:
(1) outputting a current command such that a driving current applied to the voice coil urges the tab of the actuator against a plane of the refuge place provided to the ramp block for the tab, then outputting another current command such that another driving current flowing reversal to the urging driving current is applied to the voice coil;
(2) detecting a back electromotive voltage generated by the voice coil, and outputting a back electromotive voltage signal;
(3) finding a speed difference between an actual moving speed, which is obtained from the back electromotive voltage, of the actuator and a given target speed, then calculating a current command in response to the speed difference, and outputting the current command calculated; and
(4) determining a position of the head slider whether the head slider stays above the recording medium or on the ramp section of the ramp block.

12. The method of controlling the actuator of claim 11, wherein the step of (3) comprising the sub-steps of:
outputting the given target speed;

calculating the actual moving speed of the actuator by using the back electromotive voltage signal obtained through detecting the back electromotive voltage generated on the voice coil;

detecting the speed difference by comparing the target speed and the actual moving speed; and outputting the current command in response to the speed difference.

13. The method of controlling the actuator of claim 11, wherein the driving current working in the urging direction and applied to the voice coil is a pulsed driving current having a given pulse width.

14. The method of controlling the actuator of claim 13 further comprising the step of:

(5) finding a pulse width of the pulsed driving current, with which pulse width a maximum response amount of the actuator to a pulsed driving current working on the actuator to start unloading operation, and setting the pulse width as a pulse width that is to be outputted in step (1).

15. The method of controlling the actuator of claim 14, wherein the step (5) comprising the sub-steps of:

(5-1) initializing a pulse condition to be firstly outputted;

(5-2) confirming a pulse width of the pulsed driving current applied to the voice coil, and determining whether or not the pulse width at present is smaller than a given pulse width;

(5-3) outputting a current command as per a pulse condition at present and applying a pulsed driving current to the voice coil when the pulse width at present is determined smaller than the given pulse width, and calculating a response amount of the actuator to the pulsed driving current by using the back electromotive voltage signal generated on the voice coil;

(5-4) updating an optimum value with the response amount and the pulse condition both calculated in the step of calculating a response amount as a new optimum value when the calculated response amount is greater than a stored response amount; and (5-5) adding a given pulse width to a pulse width at present, and setting a pulse width for outputting a pulse width newly set, wherein the step (5) feeds back the pulse-width newly set as a present pulse-width to the step of determining whether or not the present pulse-width is smaller than the given pulse-width, and repeats scanning loop steps until the present pulse-width reaches the given pulse width.

16. The method of control the actuator of claim 15, wherein the sub-step (5-4) of updating further comprises the steps of:

obtaining a pulse condition and a response amount at present;

comparing a stored maximum response amount with the response amount at present; and updating a stored condition value with the present response amount as a maximum response amount and the pulse condition at present as an optimum pulse condition when the response amount at present is greater than the stored maximum response amount, and maintaining the stored condition value as an optimum value without updating when the response amount at present is smaller than the stored maximum response amount.

17. The method of control the actuator of claim 11 further comprising the steps of:

(6) cutting off the driving current temporarily and detecting a vertical vibration amount of the actuator by using the back electromotive voltage signal generated on the voice coil when the tab is released from latch and stays on a first plane of the ramp section; and (7) switching a control sequence in response to the vertical vibration amount.

18. The method of control the actuator of claim 17 further comprising the step of:

(8) attenuating the vertical vibration of the actuator through feeding back an amount detected in the step of (6).

19. The method of control the actuator of claim 17 further comprising the step of:

(9) as far as an amount detected in the step of (6) stays greater than a given amount, stopping a head slider from moving from the ramp block toward the recording medium, then making the actuator retract.

* * * * *